United States Patent
Pitchumani et al.

(10) Patent No.: US 11,816,342 B2
(45) Date of Patent: Nov. 14, 2023

(54) SYSTEMS AND METHODS FOR DISTRIBUTED IN-STORAGE COMPUTATION-CONSCIOUS ERASURE CODING

(71) Applicant: SAMSUNG ELECTRONICS CO., LTD., Suwon-si (KR)

(72) Inventors: Rekha Pitchumani, Oak Hill, VA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 16/927,798

(22) Filed: Jul. 13, 2020

(65) Prior Publication Data

US 2022/0011935 A1  Jan. 13, 2022

Related U.S. Application Data

(60) Provisional application No. 63/037,585, filed on Jun. 10, 2020.

(51) Int. Cl.
*G06F 3/06* (2006.01)

(52) U.S. Cl.
CPC ............. *G06F 3/064* (2013.01); *G06F 3/067* (2013.01); *G06F 3/0619* (2013.01); *G06F 3/0652* (2013.01); *G06F 3/0653* (2013.01)

(58) Field of Classification Search
CPC ...... G06F 3/064; G06F 3/0619; G06F 3/0652; G06F 3/0653; G06F 3/067
See application file for complete search history.

(56) References Cited

U.S. PATENT DOCUMENTS

| | | | |
|---|---|---|---|
| 10,423,503 B2 | 9/2019 | Juniwal et al. | |
| 10,503,611 B1* | 12/2019 | Srivastav | G06F 11/1469 |
| 2003/0221155 A1* | 11/2003 | Weibel | H03M 13/05 |
| | | | 714/752 |
| 2011/0167239 A1* | 7/2011 | Horn | G06F 16/17 |
| | | | 711/171 |
| 2011/0202743 A1* | 8/2011 | Kaneda | G06F 3/0608 |
| | | | 711/170 |

(Continued)

FOREIGN PATENT DOCUMENTS

WO   WO-2012100087 A2 *   7/2012   .......... G06F 11/1044

*Primary Examiner* — Arpan P. Savla
*Assistant Examiner* — Eric T Loonan
(74) *Attorney, Agent, or Firm* — Lewis Roca Rothgerber Christie LLP

(57) ABSTRACT

A method includes sending, from an application layer, a chunk size setting to an erasure coding layer. The method further includes receiving, at the application layer, user data. The method further includes aligning, at the application layer, the user data based on the chunk size setting. The method further includes sending the aligned user data to the erasure coding layer. The method further includes partitioning, at the erasure coding layer, the aligned user data into a first data chunk and a second data chunk. The method further includes generating, at the erasure coding layer, a parity chunk based on the first data chunk and the second data chunk. The method further includes sending, from the erasure coding layer, the first data chunk, the second data chunk, and the parity chunk to a storage system.

18 Claims, 16 Drawing Sheets

(56) References Cited

U.S. PATENT DOCUMENTS

| | | | |
|---|---|---|---|
| 2015/0357045 A1* | 12/2015 | Moschiano | G11C 16/26 |
| | | | 714/720 |
| 2016/0378612 A1 | 12/2016 | Hipsh et al. | |
| 2018/0088815 A1* | 3/2018 | Lei | G06F 3/064 |
| 2018/0285198 A1* | 10/2018 | Dantkale | G06F 12/0811 |
| 2019/0361606 A1 | 11/2019 | Goker et al. | |

* cited by examiner

SYSTEMS AND METHODS FOR DISTRIBUTED IN-STORAGE COMPUTATION-CONSCIOUS ERASURE CODING

CROSS-REFERENCE TO RELATED APPLICATION(S)

The present application claims priority to and the benefit of U.S. Provisional Application No. 63/037,585, filed Jun. 10, 2020.

BACKGROUND

Storage systems employ erasure coding (EC) techniques to improve reliability by protecting against accidental bit erasures. These EC techniques generate parity bits for user data that can be used to regenerate the user data in the event of partial erasure. Storage systems implement these EC techniques at an erasure coding layer that is unknown to and/or not controlled by a user application that generates and/or stores the user data. The EC layer is configured to partition received user data into data chunks and to store the data chunks across one or more different storage devices in a manner that is unknown to the user application. At the same time, storage devices configured to perform computations on stored data are increasingly being used in storage systems. However, computations run on storage devices may be inefficient or generate erroneous results in systems that include an EC layer that stores user data across several storage devices in an unknown way. For example, if data used for a particular calculation is stored by the EC layer across two storage devices, performance of the particular calculation at one or more of the two storage devices may result in data transfers between the two storage devices, resulting in increased overhead associated with performing the particular calculation.

SUMMARY

Disclosed herein are systems and methods for performing erasure coding in a manner that is conscious of in-storage computation. Accordingly, the disclosed systems and methods may result in relatively more efficient in-storage computations as compared to other systems and methods that implement erasure coding.

In a first method, an EC layer receives a chunk size setting from a user application. The EC layer receives data and splits the data into chunks based on the chunk size setting. The EC layer then stores the chunks on one or more storage devices. The chunk size setting is configured so that blocks of data utilized by the user application are aligned in chunks stored by the EC layer. Accordingly, the first method may be referred to as an aligned data path EC method. For example, in a database application that organizes user data into data files, which are in turn each organized into a plurality of extents, which are in turn each organized into a plurality of pages (e.g., data blocks), the chunk size setting may be set to a size of a page (or a multiple thereof). Accordingly, a page of the database may be stored on a single storage device rather than split by the EC layer into separate chunks and stored on different devices. Therefore, related data (e.g., data within a page) may be more likely to be consolidated into fewer storage devices as compared to a system or method in which an EC layer splits pages into separate chunks. Accordingly, in-storage operations executed on storage devices in which EC is performed according to the first method may be more efficient (e.g., use fewer synchronization operations between storage devices) than in-storage operations executed on other storage devices in which EC is performed.

In a second method, a user application/file system partitions data and applies EC. The second method includes receiving data at the user application. The method further includes: aligning the data, partitioning the data into chunks, generating parity bits for the data chunks, and writing the data chunks and parity bits to storage devices. Because the application directly controls data alignment and partitioning, the application can generate the data chunks in a way that prevents related data from being split across storage devices. The second method may be referred to as a user controlled EC method.

In a third method, a user application/file system aligns and partitions data into chunks and places the chunks in storage devices. In the third method, the user application/file system identifies chunks written to the storage devices to an EC layer, and the EC layer generates parity bits and writes the parity bits to one or more storage devices. The third method may be referred to as a decoupled EC method. As in the second method, the application may prevent related data from being split across different storage devices.

In various examples disclosed herein, a user application generates and stores a metadata index that points to a storage device and a data address. For example, the second and third methods may include generating such a metadata index. The user application may use this metadata index to generate memory accesses (including in-storage commands) directed to a particular memory address of a particular storage device.

DETAILED DESCRIPTION

Figure 1:
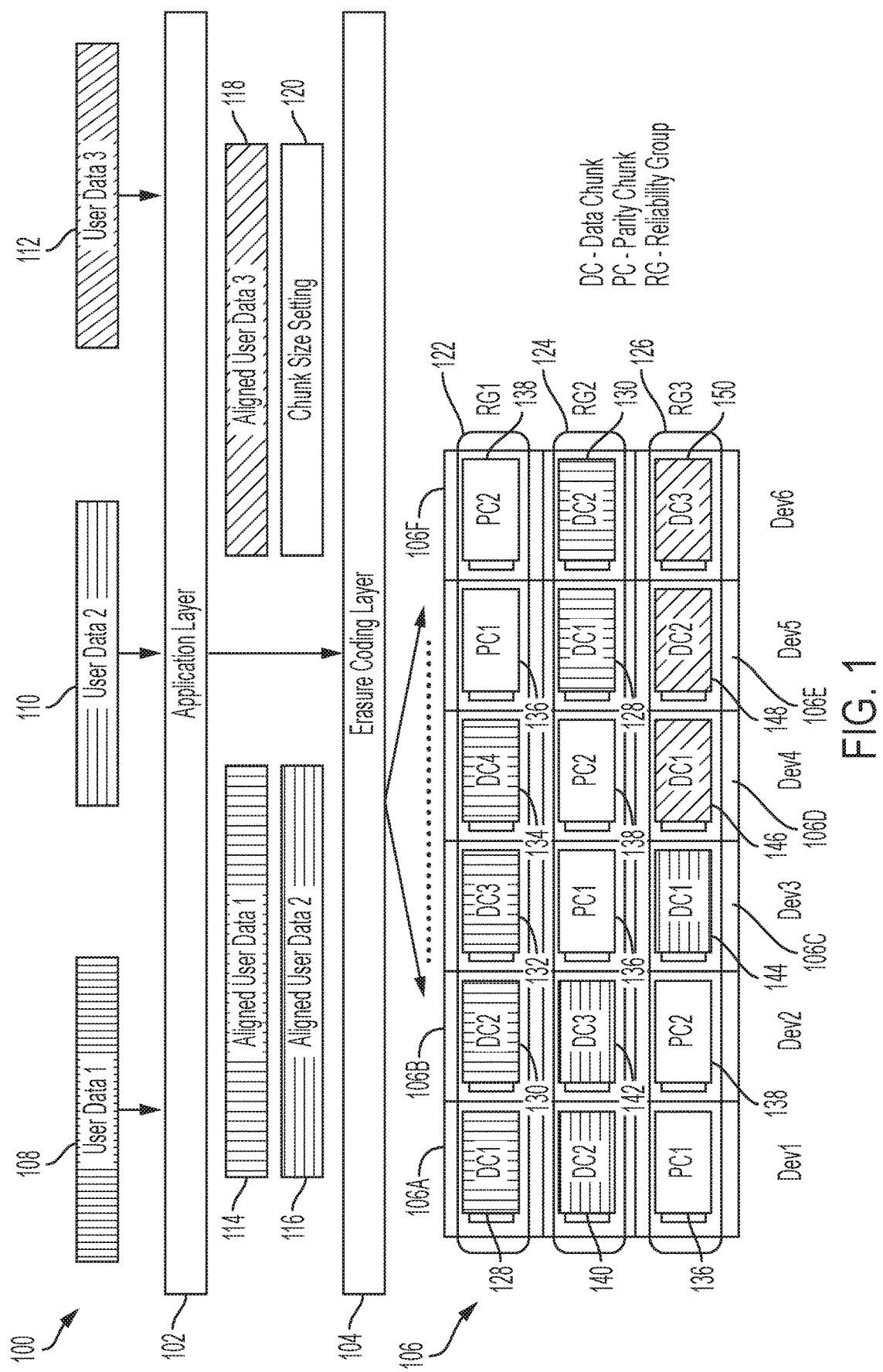
FIG. 1 is a diagram of a system for performing in-storage computation conscious erasure coding by setting a data chunk length and aligning data based on the data chunk length.

Referring to FIG. 1, a diagram of a system 100 for performing in-storage computation conscious erasure coding is shown. The system 100 includes an application layer 102. The application layer 102 corresponds to one or more applications, a file system, or a combination thereof executing on one or more computing devices. The system 100 further includes an erasure coding (EC) layer 104 in communication with the application layer 102. The EC layer 104 corresponds to software executing on one or more computing devices and configured to perform EC operations, as described herein. The system 100 further includes a storage system 106 including a plurality of storage devices in communication with the EC layer 104. In the illustrated example, the storage system 106 includes a first storage device 106A, a second storage device 106B, a third storage device 106C, a fourth storage device 106D, a fifth storage device 106E, and a sixth storage device 106F. Each of the plurality of storage devices in the storage system 106 is a computer readable storage device that includes a processing device configured to perform computations within the storage device. Example computer readable storage devices include solid state drives, hard drives, etc. While six storage devices are illustrated in the storage system 106, other examples of the system 100 may include a different number of storage devices.

The application layer 102 is configured to send a chunk size setting to the EC layer 104 and to issue memory access commands to the EC layer 104. Examples of memory access commands include a data write, a data read, an in-storage computation command, etc. The EC layer 104 is configured to partition data received from the application layer 102 into data chunks based on the chunk size setting received from the application layer 102 and to store the chunks in the storage system 106. The EC layer 104 is further configured to store address translation data based on where the chunks are stored in the storage system 106. The EC layer 104 is further configured to generate parity bits based on the chunks and to store the parity bits in the storage system 106. In addition, the EC layer 104 is configured to translate addresses included in memory access commands based on the stored address translation data. The storage system 106 is configured to store data received from the EC layer 104, to return data to the EC layer 104 in response to read requests, and to perform in-storage computations based on commands received from the EC layer 104.

In the illustrated example, the application layer 102 receives first user data 108, second user data 110, and third user data 112. The user data 108, 110, 112 may be received from an external computer system, via user input, from another source, generated by an application of the application layer 102, or a combination thereof. The application layer 102 is configured to perform data alignment on received user data. In the illustrated example, the application layer 102 generates first aligned user data 114 based on the first user data 108, second aligned user data 116 based on the second user data 110, and third aligned user data 118 based on the third user data 112. Further, the application layer 102 sends a chunk size setting 120 to the EC layer 104. The chunk size setting 120 may be set by the application layer 102 based on a size of a data unit commonly operated on by the application layer 102 (or a particular application thereof). For example, the chunk size setting 120 may correspond to a size (e.g., 8 KB) of a page in a database.

User data, such as the first user data 108, the second user data 110, and the third user data 112, may be larger than the size indicated by the chunk size setting 120. By aligning the user data, the application layer 102 may control how units of the user data (e.g., pages, words, etc.) are partitioned into data chunks by the EC layer 104 (as described further below). In some examples, performing data alignment includes adding padding (e.g., null values) to the user data so that one or more padded units (e.g., pages) of the user data align with the chunk size setting. For example, the first user data 108 may include a first page having a size of 7 KB and a second page having a size of 8 KB while the chunk size setting 120 indicates a chunk size of 8 KB. Aligning the first user data 108 to generate the first aligned user data 114 may include padding the first page (e.g., by adding null values) to a size of 8 KB. Accordingly, partitioning (e.g., at the EC layer 104, as described below) the first aligned data 114 into data chunks based on the chunk size setting 120 may result in a first data chunk including the first page and a second data chunk including the second page.

It should be noted that while the above example describes aligning the first user data 108 so that one padded unit (e.g., page) of the user data 108 is the size of one data chunk, other ratios are possible. For example, the first page of the user data 108 may have a size of 7 KB, a second page of the user data 114 may have a size of 6 KB, and a third page of the user data 114 may have a size of 16 KB while the chunk size setting 120 indicates a chunk size of 16 KB. Aligning the first user data 108 to generate the first aligned user data 114 may include padding the first page and the second page to sizes of 8 KB each or padding the second page to a size of 9 KB so that the first page and the second page together are 16 KB. Accordingly, partitioning (e.g., at the EC layer 104, as described below) the first aligned data 114 into data chunks based on the chunk size setting 120 may result in a first data chunk including the first page and the second page and a second data chunk including the third page.

In some examples, aligning the user data includes shifting (e.g., transposing) one or more units of the user data with or without adding padding. For example, the first user data 108 may include a first page of 4 KB, a second page of 8 KB, and a third page of 4 KB, and the chunk size may be equal to 8 KB. The application layer 102 may generate the first aligned data 114 by placing the third page between the first page and the second page. Accordingly, partitioning (e.g., at the EC layer 104, as described below) the first aligned data 114 into data chunks based on the chunk size setting 120 may result in a first data chunk including the first page and the third page and a second data chunk including the second page. Other data alignment schemes according to the disclosure are possible.

Thus, by aligning input user data based on the chunk size setting 120, the application layer 102 may control how units of the user data are partitioned into data chunks based on the chunk size setting (e.g., by the EC layer 104, as described below). While described as preventing splits of data units (e.g., pages) across data chunks, in some examples, data is aligned by the application layer 102 to control how a data unit is split across data chunks. Padding user data input to the application layer 102 may result in aligned user data output from the application layer 102 being larger than the input user data. For example, the first aligned user data 114 may be larger than the first user data 108. The chunk size setting 120 may be set based on user input, based on an application setting of an application executed by the application layer 102, or based on some other input. Each application in the application layer 102 may send a corresponding chunk size setting to the EC layer 104 to be used by the EC layer 104 to partition user data from that application.

Thus, the EC layer 104 partitions the first aligned user data 114, the second aligned user data 116, and the third aligned user data 118 based on the chunk size setting 120 to generate data aligned chunks. Each aligned data chunk has the size indicated by the chunk size setting 120. The EC layer 104 generates parity chunks based on the aligned data chunks according to an EC technique and stores the parity chunks and the aligned data chunks in the storage system 106. In the illustrated example, the EC layer 104 is configured to establish a first reliability group 122, a second reliability group 124, and a third reliability group 126 across the storage system 106. In the first reliability group 122, a first aligned data chunk 128 of the first aligned user data 114 is stored on the first storage device 106A; a second aligned data chunk 130 of the first aligned user data 114 is stored on the second storage device 106B; a third aligned data chunk 132 of the first aligned user data 114 is stored on the third storage device 106C; a fourth aligned data chunk 134 of the first aligned user data 114 is stored on the fourth storage device 106D; a first parity chunk 136 is stored on the fifth storage device 106E; and a second parity chunk 138 is stored on the sixth storage device 106F. In the second reliability group 124, a second aligned data chunk 140 of the second aligned user data 116 is stored on the first storage device 106A; a third aligned data chunk 142 of the second aligned user data 116 is stored on the second storage device 106B; the first parity chunk 136 is stored on the third storage device 106C; the second parity chunk 138 is stored on the fourth storage device 106D; the first aligned data chunk 128 of the first aligned user data 114 is stored on the fifth storage device 106E; and the second aligned data chunk 130 of the first aligned user data 114 is stored on the sixth storage device 106F. In the third reliability group 126, the first parity chunk 136 is stored on the first storage device 106A; the second parity chunk 138 is stored on the second storage device 106B; a first aligned data chunk 144 of the second aligned user data 116 is stored on the third storage device 106C; a first aligned data chunk 146 of the third aligned user data 118 is stored on the fourth storage device 106D; a second aligned data chunk 148 of the third aligned user data 118 is stored on the fifth storage device 106E; and a third aligned data chunk 150 of the third aligned user data 118 is stored on the sixth storage device 106F.

Thus, the application layer 102 is configured to set a chunk size setting and to align user data based on the chunk size setting. The application layer 102 may be configured to select the chunk size setting based on a type of processing done by the application layer 102. For example, in response to the application layer 102 (or an application thereof) being configured to operate on data arranged in pages, the application layer 102 may be configured to set the chunk size setting to a size of a page of data. Because the chunk size setting is selected by the application layer 102 and the user data is aligned based on the chunk size, related data may be more concentrated into fewer aligned data chunks (e.g., the EC layer may be prevented from splitting a data page between two chunks). Accordingly, in-storage computation commands issued to the storage system 106 (e.g., by the EC layer 104) may result in fewer data synchronization operations between storage devices of the storage system 106 as compared to implementations in which data is not aligned based on EC chunk size.

Figure 2:
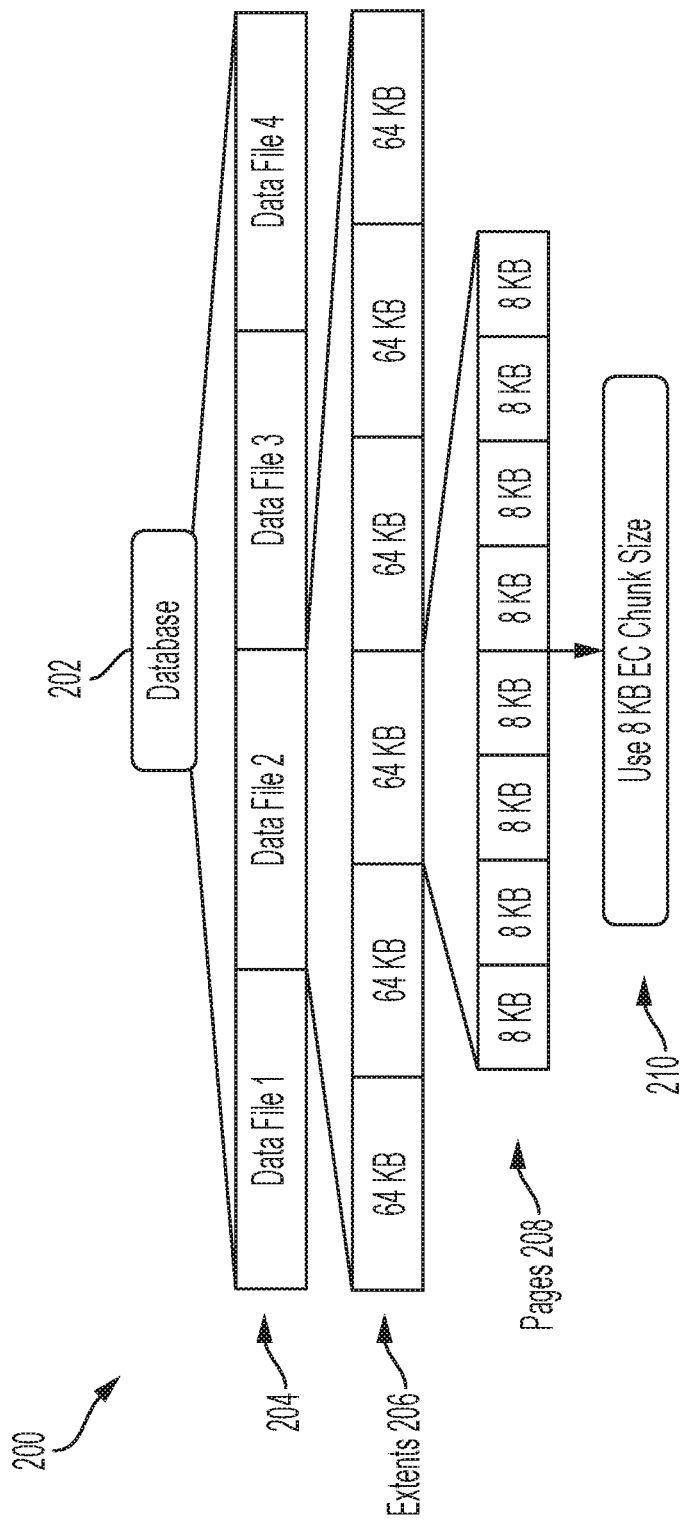
FIG. 2 is a chart showing an example of a data hierarchy that may be used in a system that aligns data based on chunk size.

FIG. 2 shows a chart 200 of an example data hierarchy that may be used in a system that aligns data based on chunk size. As shown in the chart 200, a database 202 may be divided into a plurality of data files 204. Each of the data files 204 may be further divided into a plurality of extents 206. Each extent may be further divided into a plurality of pages 208. As shown, a system for performing in-storage computation conscious erasure coding, such as the system 100, may adopt a chunk size 210 that is equal to a size of a page 208. Accordingly, pages of the database 202 will not be split across data chunks generated by the system for performing in-storage computation conscious erasure coding. Therefore, in-storage computation commands (e.g., computations that utilize one or more whole pages of data) may incur fewer synchronization operations between storage devices, such as storage devices of the storage system 106 of FIG. 1. In alternative examples, the chunk size 210 may correspond to a size of one of the extents 206 or a size of one of the data files 204.

Figure 3:
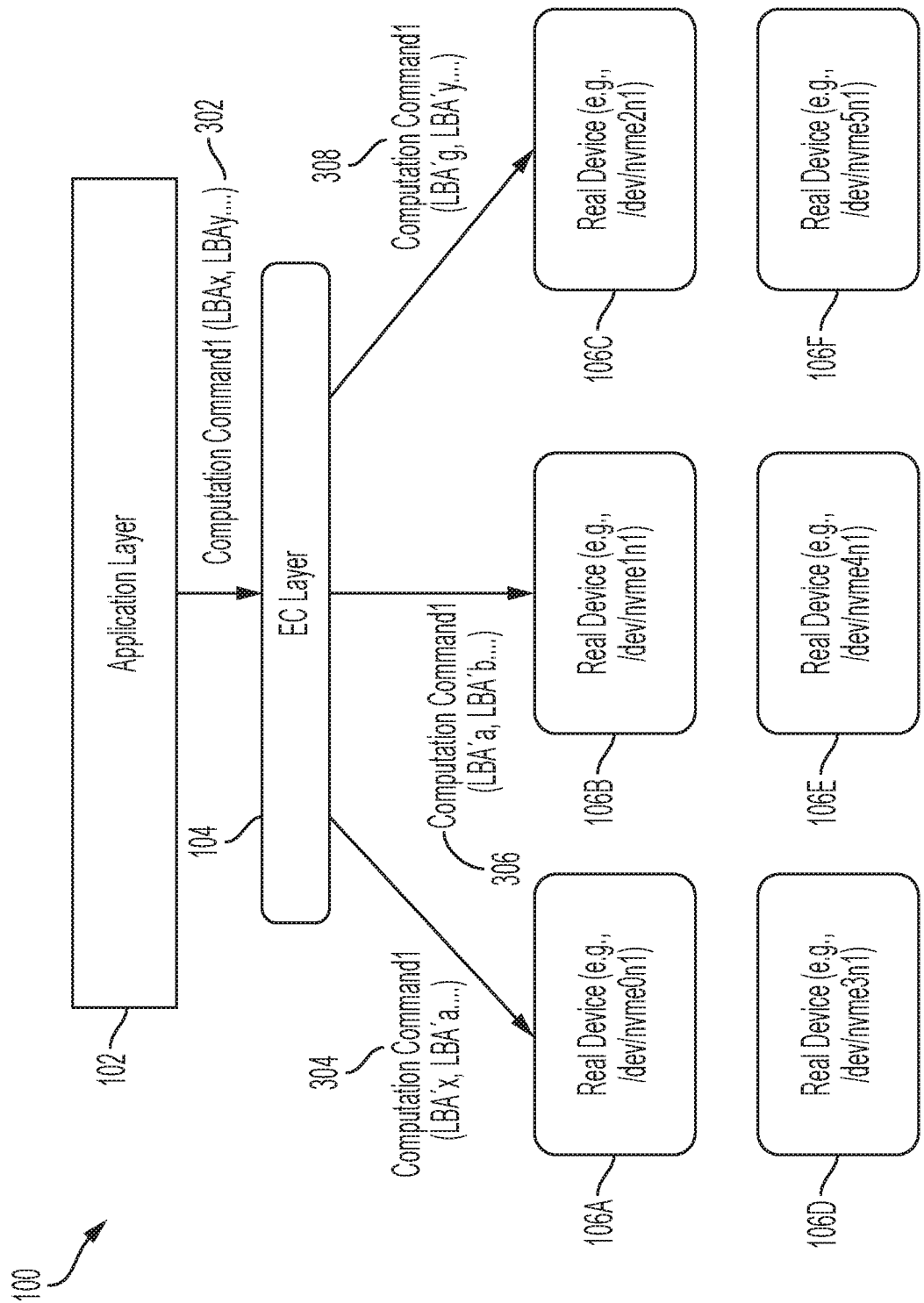
FIG. 3 is a diagram illustrating distribution of in-storage computation commands in a system that aligns data based on chunk size.

Referring to FIG. 3, a diagram illustrating distribution of in-storage computation commands in the system 100 for performing in-storage computation conscious erasure coding is shown. In the illustrated example, the application layer 102 sends a computation command 302 to the EC layer 104. The computation command 302 specifies a command and an address range. The EC layer 104 translates the address range to one or more translated address ranges recognized by the storage devices of the storage system 106. For example, the EC layer 104 may expose a first virtual address space to the application layer 102 and map virtual address ranges of the first virtual address space to second virtual address ranges recognized by the plurality of storage devices in the storage system 106 using an offset calculation based on the chunk size setting. Alternatively, the EC layer 104 may maintain a data structure that maps virtual address ranges to translated virtual address ranges recognized by the storage system 106. The EC layer 104 may update the data structure as the data chunks 128, 130, 132, 134, 138, 140, 142, 144, 146, 148, 150 are stored in the storage system 106.

The EC layer 104 generates modified commands 304, 306, 308, based on the computation command 302, by translating the address indicated by the command 302 into translated address ranges recognized by the storage devices of the storage system 106. The systems described herein may utilize logical block addresses (LBAs). In the illustrated example, the EC layer 104 determines that the address range identified by the command 302 (LBAx, LBAy) is mapped to a first translated address range (LBAx', LBAa') recognized by the first storage device 106A, to a second translated address range (LBAa', LBAb') recognized by the second storage device 106B, and to a third translated address range (LBAg', LBAy') recognized by the third storage device 106C. The EC layer 104 generates first modified command 304 by replacing the address range (LBAx', LBAy') indicated by the command 302 with the first translated address range (LBAx', LBAa') recognized by the first storage device 106A. The EC layer 104 generates second modified command 306 by replacing the address range (LBAx, LBAy) indicated by the command 302 with the second translated address range (LBAa', LBAb') recognized by the second storage device 106B. The EC layer 104 further generates third modified command 308 by replacing the address range (LBAx, LBAy) indicated by the command 302 with the third translated address range (LBAg', LBAy') recognized by the third storage device 106C.

It should be noted that the application layer 102 may include more than one application. Further, the EC layer 104 may implement several virtual EC devices that each expose a different virtual address space to the application layer 102. The EC layer 104 is configured to map addresses (e.g., LBA addresses) associated with the virtual devices to addresses (e.g., LBA' addresses) recognized by the storage system 106. In operation, a particular virtual device may be mapped by the EC layer 104 to address ranges on more than one of the devices in the storage system 106. The EC layer 104 is configured to receive a chunk size setting (e.g., the chunk size setting 120) for each virtual EC device and to generate data chunks based on those chunk size settings for storage in the storage system 106, as shown in FIG. 1. Each chunk size setting may be generated by a corresponding application (e.g., based on a type of data the application operates on, based on a type of operation performed by the application, etc.).

Figure 4:
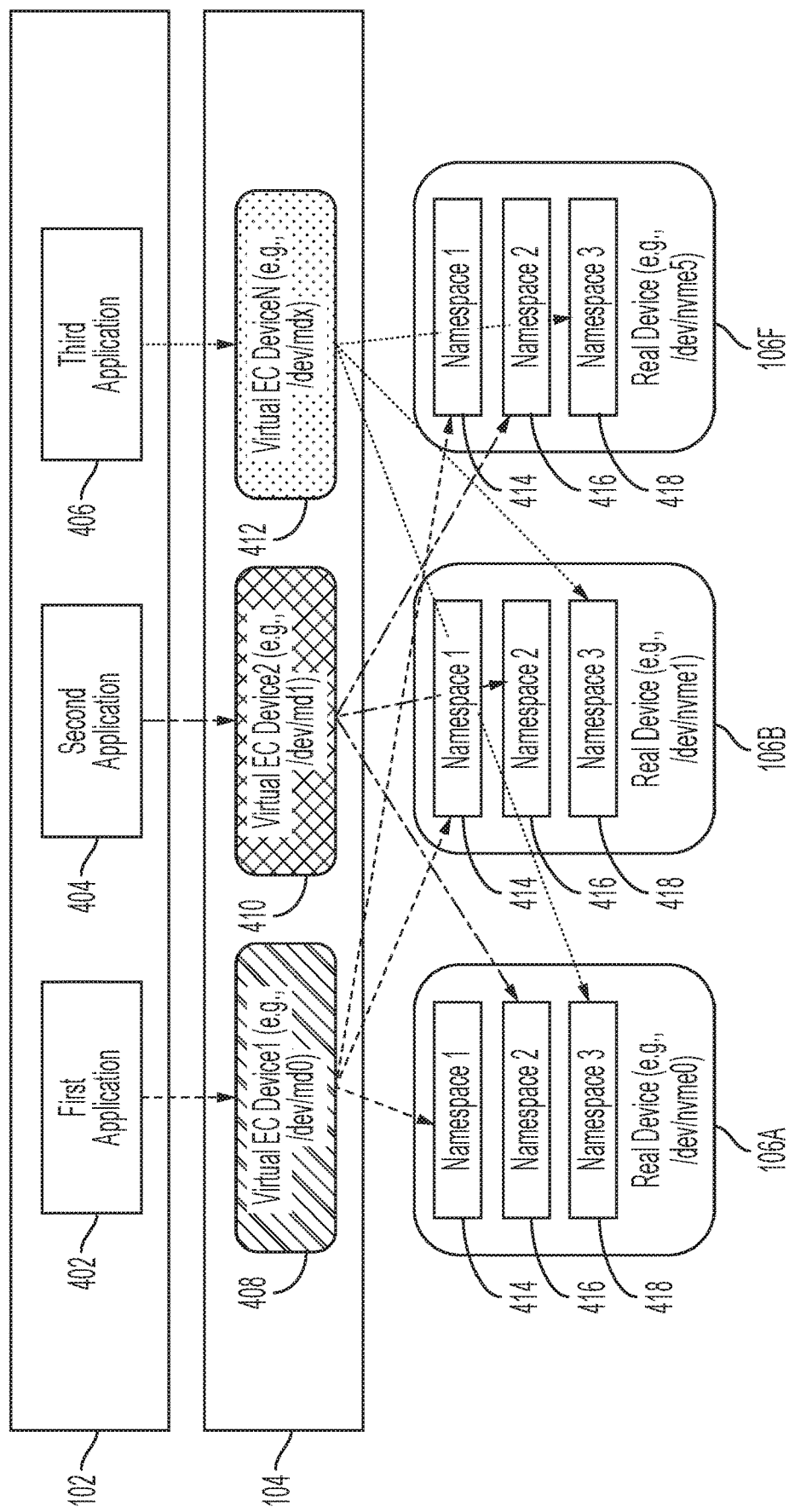
FIG. 4 is a diagram showing an example in which an application layer includes more than one application.

FIG. 4 depicts an example in which the application layer 102 includes a first application 402, a second application 404, and a third application 406. The EC layer 104 includes a first virtual EC device 408 that exposes a first namespace 414 to the first application 402; a second virtual EC device 410 that exposes a second namespace 416 to the second application 404; and a third virtual EC device 412 that exposes a third namespace 418 to the third application 406. Each of the namespaces 414, 416, 418 corresponds to translated address ranges in the storage system 106. Each of the virtual EC devices 408, 410, 412 is configured to partition data into data chunks based on a data chunk size received from the application layer 102 as shown in FIG. 1. For example, the first virtual EC device 408 may partition data chunks received from the first application 402 based on a chunk size setting received from the first application 402. While FIG. 4 depicts a one to one correspondence between virtual devices and namespaces, it should be noted that more than one virtual device may be mapped to a single namespace in some examples.

Each of the virtual EC devices 408, 410, 412 is configured to translate address ranges identified in in-storage computation commands to translated address ranges recognized by the storage system 106, as described in FIG. 3. For example, the first virtual EC device 408 may receive an in-storage computation command from the first application 402 specifying an address range within the first namespace 414. The first virtual EC device 408 may translate the address range into one or more translated address ranges recognized by the plurality of storage devices of the storage system 106 and send modified versions of the in-storage command (e.g., versions that specify the identified translated address ranges) to the corresponding storage devices.

Thus, FIG. 4 depicts how a system for performing in-storage computation conscious erasure coding may support a plurality of namespaces that each have an associated data chunk size. Other examples include different numbers of applications and/or different numbers of virtual EC devices. While the applications 402, 404, 406 and virtual EC devices 408, 410, 412 are shown as having a one to one correspondence, it should be noted that more than one application may interact with a single virtual EC device. Similarly, a virtual EC device may interact with more than one application.

Figure 5:
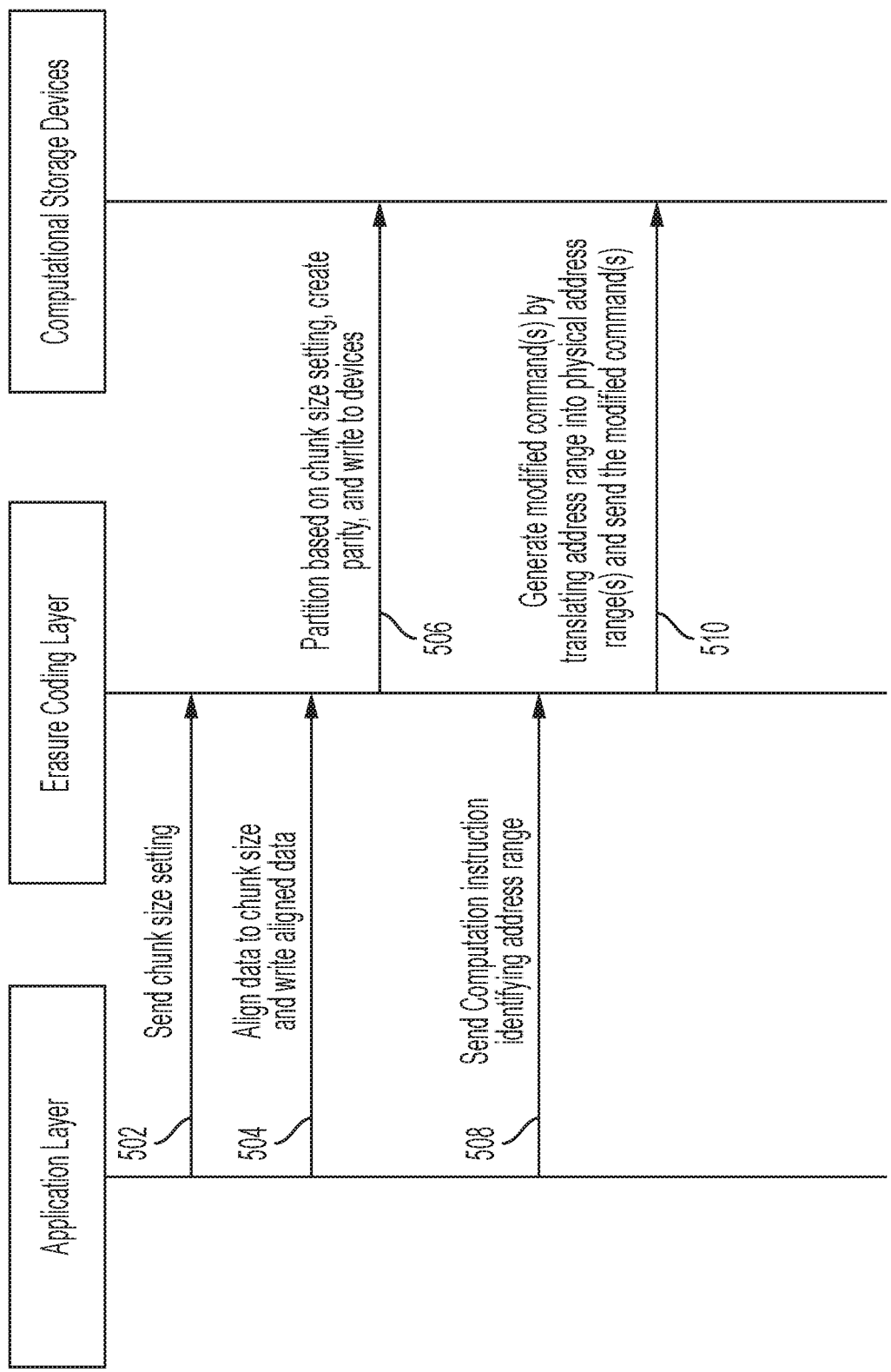
FIG. 5 is a diagram showing a method for performing in-storage computation conscious erasure coding.

Referring to FIG. 5, a diagram illustrating a method 500 for performing in-storage computation conscious erasure coding is shown. The method 500 may be performed by a system for performing in-storage computation conscious erasure coding, such as the system 100 of FIG. 1. The method 500 includes sending a chunk size setting from an application layer to an EC layer, at 502. For example, the application layer 102 may send the chunk size setting 120 to the EC layer 104.

The method 500 further includes aligning, at the application layer, data to the chunk size and writing the aligned data to the EC layer, at 504. For example, the application layer 102 may align the first user data 108 to the chunk size indicated by the chunk size setting 120 in order to generate the first aligned user data 114. Aligning the first user data 108 to generate the aligned user data 114 may include padding data segments (e.g., pages or other data units) within the first user data 108 to align with the chunk size indicated by the chunk size setting 120.

The method 500 further includes partitioning, at the EC layer, the aligned data into one or more data chunks based on the chunk size setting, performing EC to generate parity chunks, and writing to computational storage devices, at 506. For example, the EC layer 104 may partition the aligned user data 114 into the first data chunk 128, the second data chunk 130, and the fourth data chunk 134; write the data chunks 128, 130, 132, 134 to the storage system 106; generate parity chunks 136, 138 based on the data chunks 128, 130, 132, 134; and write the parity chunks 136, 138 to the storage system 106.

The method 500 further includes sending a computation instruction identifying an address range from the application layer to the EC layer, at 508. For example, the application layer 102 may send the computation command 302 to the EC layer 104. The computation command 302 may identify an address range (e.g., LBAx, LBAy).

The method 500 further includes generating one or more modified commands by translating the address range into one or more translated address ranges and sending the one or more modified commands to the computational storage devices, at 510. For example, the EC layer 104 may translate the address range LBAx, LBAy to several translated sub-ranges, including a first translated address range LBAx', LBAa' on the first storage device 106A; a second translated address range LBAa', LBAb' on the second storage device 106B; and a third translated address range LBAg', LBAy' on the third storage device 106C. The EC layer 104 may send the first modified version 304 of the computation command 302 identifying the first translated address range to the first storage device 106A; send the second modified version 306 of the computation command 302 identifying the second translated address range to the second storage device 106B; and send the third modified version 308 of the computation command 302 identifying the third translated address range to the third storage device 106C.

Accordingly, the method 500 may be utilized to set a chunk size setting, to align data based on the chunk size setting, to partition the aligned data into chunks based on the chunk size setting, and to send computation commands to storage devices for in-storage computations that utilize the EC data chunks. The disclosed method 500 may result in more efficient in-storage computations as compared to methods that do not chunk data based on a chunk size setting set by an application layer that aligns the data.

Figure 6:
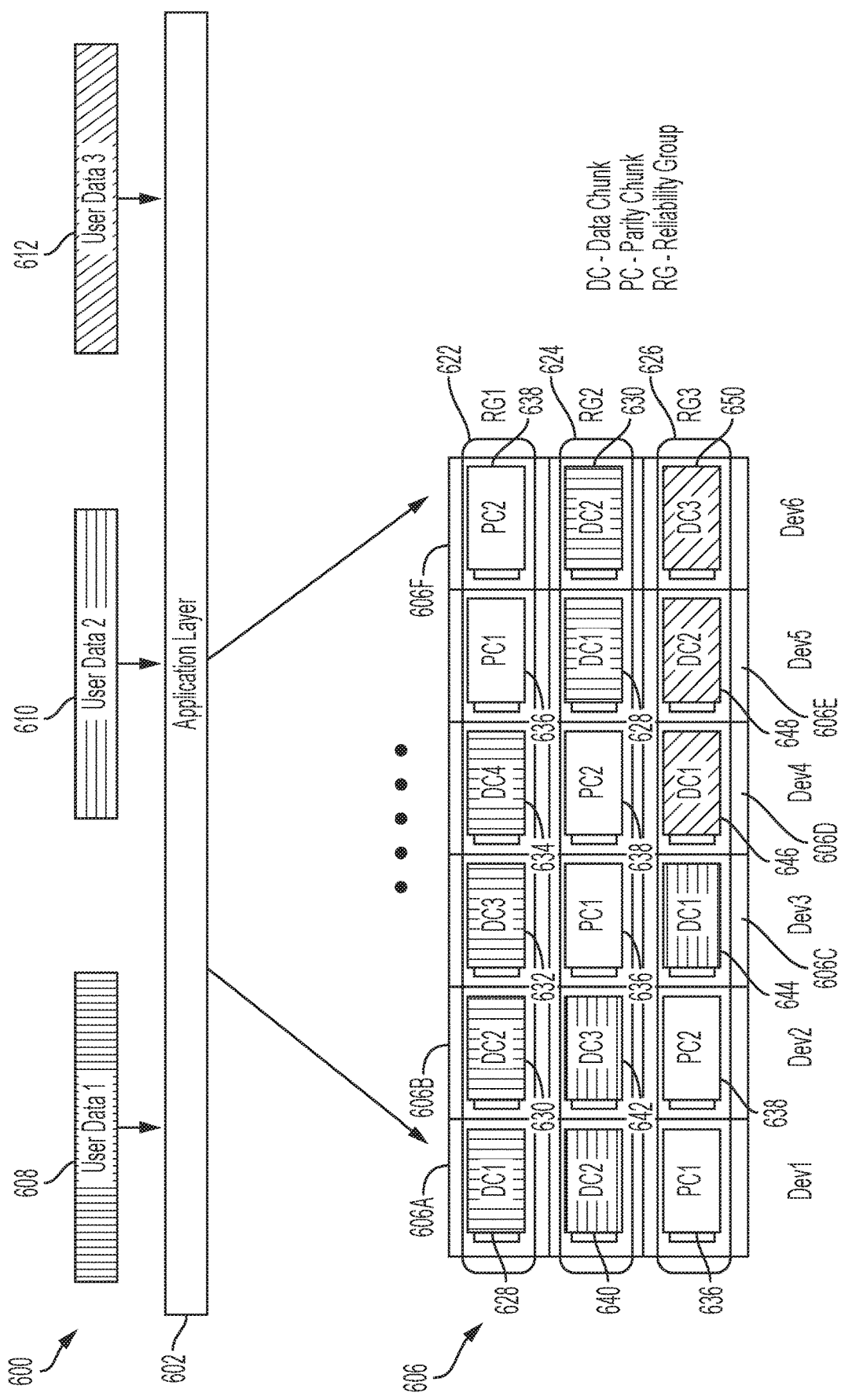
FIG. 6 is a diagram of a system for performing in-storage computation conscious erasure coding in which an application layer partitions data and performs erasure coding.

Referring to FIG. 6, a diagram of another system 600 for performing in-storage computation conscious erasure coding is shown. The system 600 includes an application layer 602 that generally corresponds to the application layer 102 of FIG. 1 and a storage system 606 that corresponds to (e.g., has the same configuration as) the storage system 106 of FIG. 1. The application layer 602 is configured to partition user data into data chunks and to perform EC on the data chunks rather than a separate EC layer. Because the application layer 602 partitions user data into data chunks rather than a separate EC layer, the application layer 602 may generate the data chunks in a way that prevents a unit (e.g., a page, a word, etc.) of the user data from being split across two separate data chunks. Further, the application layer 602 may partition the user data into data chunks of unequal size. For example, the application layer 602 may partition user data including a first page of 6 KB and a second page of 5 KB into a first data chunk including the first page and a second data chunk including the second page. Alternatively, the application layer 602 may partition the user data into chunks of a uniform size based on a chunk size setting. The chunk size setting may be set based on a size of data units (e.g., a page size) frequently operated on by the application layer 602. Prior to partitioning the user data, the application layer 602 may align the user data based on the chunk size setting using one or more alignment techniques described above with respect to the application layer 102.

In the illustrated example, the application layer 602 receives first user data 608, second user data 610, and third user data 612. The application layer 602 partitions the first user data 608 into a first data chunk 628, a second data chunk 630, a third data chunk 632, and a fourth data chunk 634 and stores these data chunks 628, 630, 632, 634 in the storage system 606. The application layer 602 further partitions the second user data 610 into a first data chunk 644, a second data chunk 640, and a third data chunk 642 and stores these data chunks 644, 640, 642 in the storage system 606. The application layer 602 further partitions the third user data 612 into a first data chunk 646, a second data chunk 648, and a third data chunk 650 and stores the data chunks 646, 648, 650 in the storage system 606. In addition, the application layer 602 generates parity chunks 636, 638 based on the data chunks 628, 630, 632, 634, 640, 642, 644, 646, 648, 650 and stores the parity chunks 636, 638 in the storage system 606.

Because the application layer 602 directly partitions the data, the application layer 602 may prevent units of data from breaking across data chunks. In a particular illustrative example, the application layer 602 stores and operates on text data. For example, the second user data 610 may include the text string "The traditional EC task," and the application layer 602 may be configured to issue text based computation commands, such as a word count command, to the storage system 606 (e.g., to specific storage devices in the storage system 606) for in-storage computation. The application layer 602 may generate the data chunks 644, 640, 642 such that no words are split between data chunks. For example, the application layer 602 may partition "The" into the first data chunk 644, "traditional EC" into the second data chunk 640, and "task" into the third data chunk 642. Accordingly, a word count command issued to the storage system 606 for the address range corresponding to the string "The traditional EC task" may correctly return a result of four because no word is double counted as a result of breaking across two chunks. In contrast, in a system that includes an EC layer that blindly partitions unaligned data into data chunks, the string may be split into the data chunks "The tradi" and "tional EC task" and stored on two separate storage devices. A word count command issued to the two separate storage devices may result in an incorrect result of five because "traditional" is double counted.

The system 100 described above may overcome this problem by aligning the string based on chunk size. For example, the application layer 102 may insert padding (e.g., "null characters") into the string to generate an aligned string (e.g., the second aligned user data 116) of "The \0\0\0\0\0" "traditional EC task," which may be partitioned by the EC layer 104 into a first data chunk including "The \0\0\0\0\0" and a second data chunk including "traditional EC task." Accordingly, an in-storage computation of word count executed on the data chunks by either the system 100 or the system 600 may result in a correct result of four.

Figure 7:
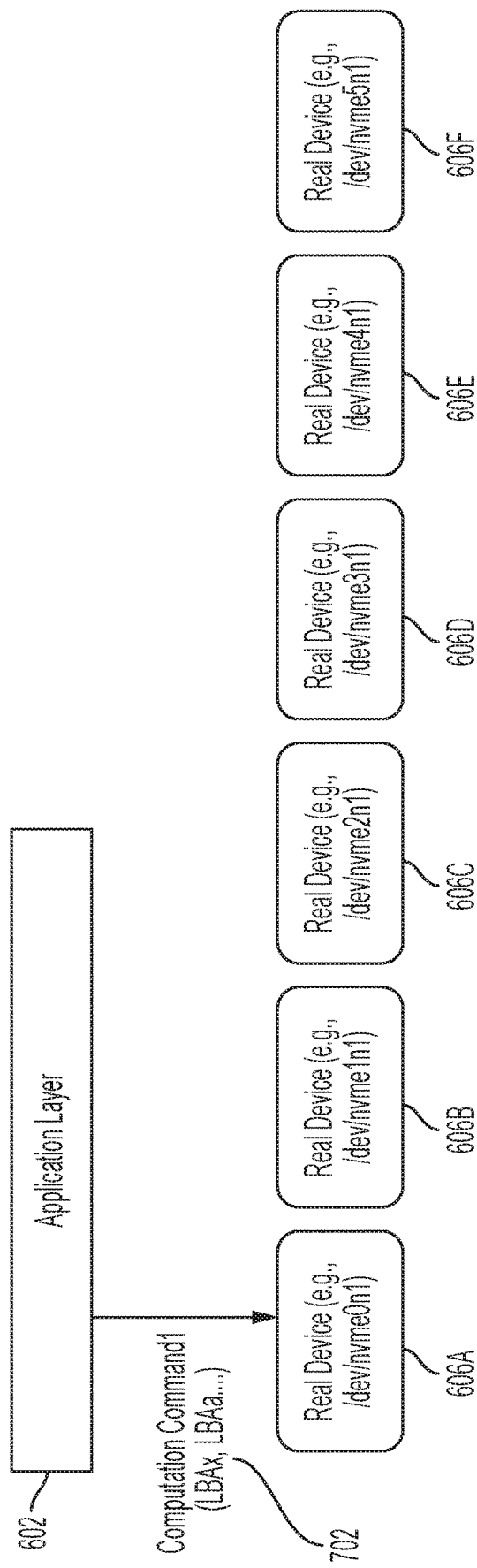
FIG. 7 is a diagram illustrating distribution of in-storage computation commands in a system in which an application layer partitions data and performs erasure coding.

Referring to FIG. 7, a diagram illustrating distribution of in-storage computation commands in the system 600 for performing in-storage computation conscious erasure coding is shown. The application layer 602 is configured to issue in-storage computation commands directly to the storage system 606 (e.g., to one or more specific storage devices of the storage system 606) as shown. In the illustrated example, the application layer 602 issues a computation command 702 to the first storage device 606A for in-storage computation. The computation command 702 includes a range of addresses of memory locations associated with the first storage device 606A.

Figure 8:
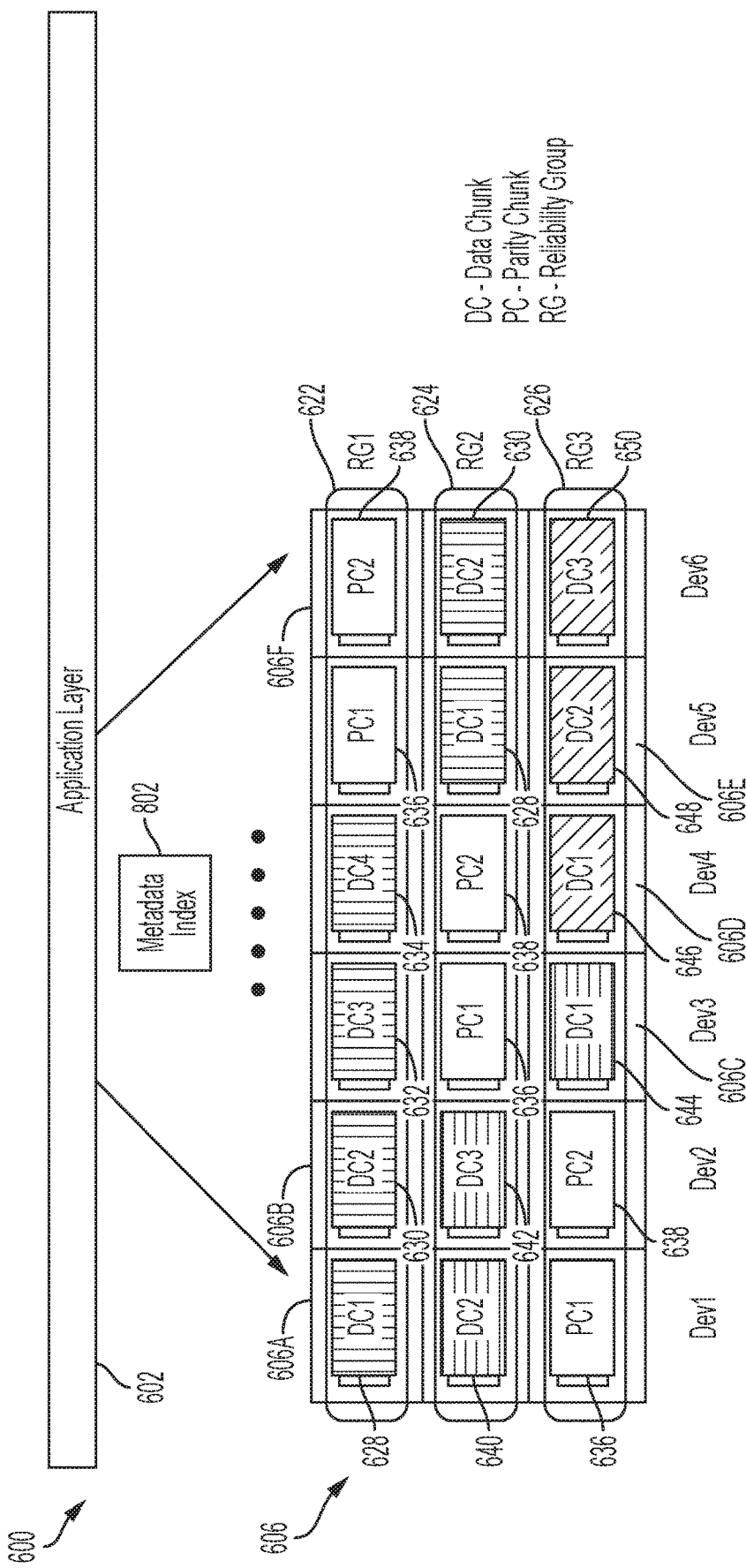
FIG. 8 is a diagram showing an example in which a system for performing in-storage computation conscious erasure coding generates a metadata index.

The application layer 602 of the system 600 is further configured to generate and store metadata indices of user data that is partitioned and stored on the storage devices 606. The metadata indices point to a combination of device identifiers and addresses. FIG. 8 illustrates an example in which a system for performing in-storage computation conscious erasure coding generates a metadata index. In the illustrated example, the application layer 602 generates a metadata index 802 associated with the first user data 608 and replicates (e.g., stores) the metadata index 802 at one or more known addresses in the plurality of devices 606. In some implementations, the metadata index 802 corresponds to a tree data structure or a table. Other structures may also be used for the metadata index 802. In some implementations, the application layer 602 replicates the metadata index 802 based on a hash of the index address.

In some implementations, the application layer 602 partitions the metadata index 802 into chunks and applies EC to the metadata index chunks to generate parity chunks for the metadata index 802. These metadata parity chunks can be stored by the application layer 602 in the storage system 606.

In some implementations in which the metadata index 802 corresponds to a tree structure, the application layer 602 generates parity chunks for leaf nodes of the metadata index and replicates non-leaf nodes in the storage system 606. For example, the application layer 602 may combine erasure coding and replication of the metadata index 902 by erasure coding parts of the metadata index 902 that are not frequently modified (e.g., leaf nodes) and replicating parts of the metadata index 902 that are frequently modified (e.g., non-leaf nodes).

Figure 9:
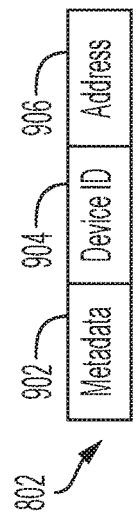
FIG. 9 is a diagram showing an example of a metadata index.

Referring to FIG. 9, an example metadata index entry structure 802 is shown. As illustrated, the entry of the metadata index 802 includes metadata 902 that is linked to a combination of a device ID 904 and an address 906. The metadata 902 may include a file name, a database name, a database page identifier, a key name, an LBA, a virtual address, some other identifier, or a combination thereof. The device ID 904 is an identifier of one of the storage system 606; the address 906 is an address within that storage device (the address may be a virtual address). Thus, the metadata index 802 identifies a device and a location within the device of data associated with the metadata 902. For example, the metadata 902 may correspond to the third user data 612, and the device ID 904 may indicate that the first data chunk 646 of the third user data 612 is stored on the fourth device 606D. The address 906 may indicate an address within the fourth device 606D of the first data chunk 646 of the third user data 612. The metadata index 802 may further point to additional chunks of the third user data 612 by indicating additional device ID/address pairs. Further, in situations in which a data chunk is stored at more than one location (e.g., as with the first data chunk 628 of the first user data 608), the metadata index 802 may point to each device location/pair at which the data chunk is stored. Thus, FIG. 9 illustrates an example of a metadata index that may be used by a system for performing in-storage computation conscious erasure coding in which an application layer partitions and stores data.

Figure 10:
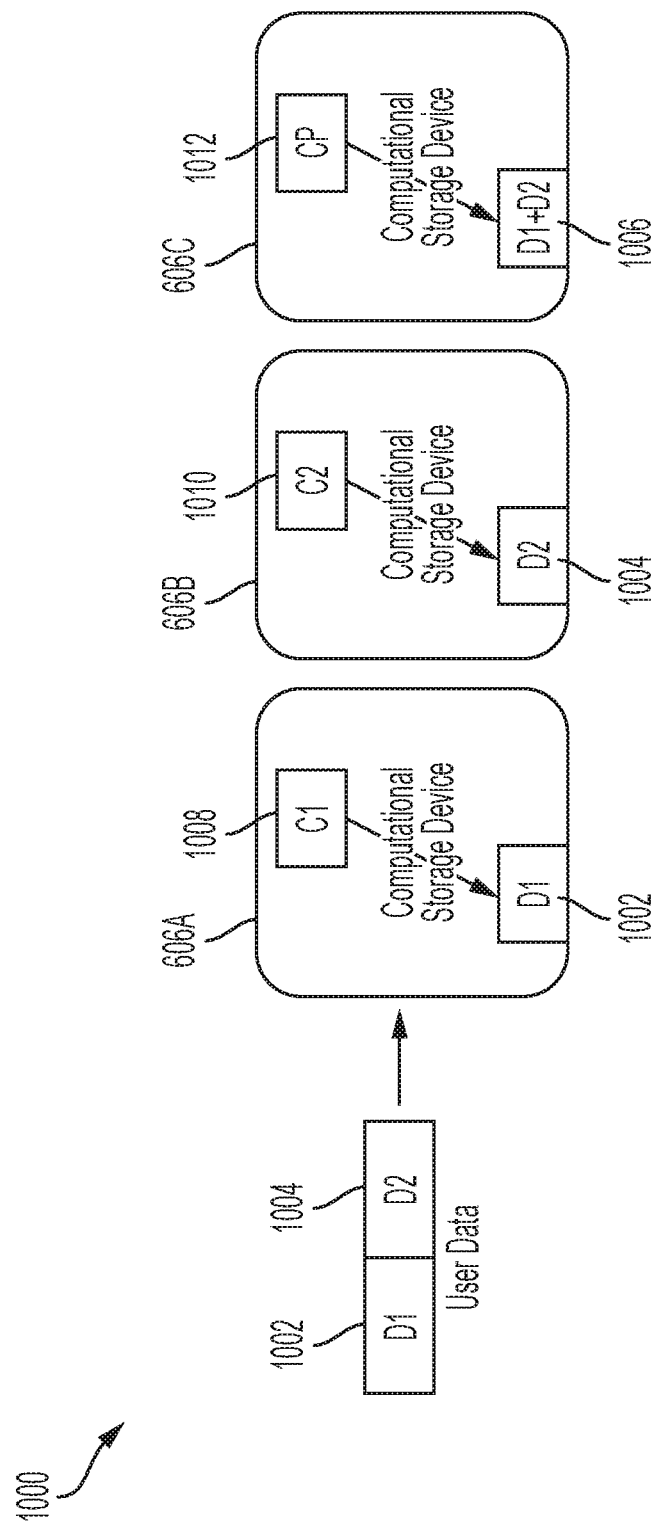
FIG. 10 is a diagram showing computation commands issued to storage devices that store data chunks and to a device that stores a parity chunk.

It should be noted that because the application layer has access to parity chunks stored in the storage system 606, the application layer 602 may issue computation commands to storage devices that include parity chunks. For example, parity chunks generated by the application layer 602 may correspond to erasure codes that define codewords as a linear combination of data words, and a computation command may correspond to a linear computation, such as matrix multiplication. Accordingly, a computation command may be directed to both data chunks and parity chunks. For example, FIG. 10 illustrates an example in which the user application 602 has stored a first user data chunk 1002 in the first storage device 606A, stored a second user data chunk D2 in the second storage device 606B, and stored a parity chunk 1006 in the third storage device 606C. The parity chunk 1006 is based on the user data chunks 1002, 1004 and can be used in conjunction with one of the user data chunks 1002, 1004 to reconstruct the other of the user data chunks 1002, 1004. Accordingly, to perform an operation on the user data chunks 1002, 1004, the application layer 602 may issue a computation command to the first storage device 606A and the second storage device 606B; to the first storage device 606A and the third storage device 606C; or to the second storage device 606B and the third storage device 606C. The application layer 602 can determine a correct result of the operation on the user data chunks 1002, 1004 based on a combination of any 2 results.

The illustrated example shows the application layer 602 issuing a first command 1008 to the first storage device 606A, a second command 1010 to the second storage device 606B, and a third command 1012 to the third storage device 606C. The first command 1008 is directed to the first user data chunk 1002, the second command 1010 is directed to the second user data chunk 1004, and the third command 1012 is directed to the parity chunk 1006.

In some implementations, in response to a data operation targeting particular user data, the application layer 602 is configured to issue computation commands to all storage devices that store data chunks and/or parity chunks that can be used to reconstruct the particular user data and to use a fastest k results (e.g., first k results returned to the application layer 602) to generate results of the data operation. For example, the application layer 602 may issue one or more of the commands 1008, 1010, 1012 based on relative speeds of the storage devices 606A, 606B, 606C.

In some implementations, in response to a data operation targeting particular user data, the application layer 602 is configured to issue computation commands to each storage device that stores a data chunk and/or a parity chunk that can be used to reconstruct the particular user data. For example, the application layer 602 may issue the first command 1008, the second command 1010, and the third command 1012 in response to a data operation targeting the user data corresponding to the first data chunk 1002 and the second data chunk 1004 and generate a result of the data operation based on whichever results return to the application layer fastest. For example, the application layer 602 may generate a result of the data operation based on results of the first command 1008 and the second command 1010; based on results of the first command 1008 and the third command 1012; or based on results of the second command 1010 and the third command 1012, depending on which results are received by the application layer 602 first. In some implementations, in response to a data operation targeting particular user data, the application layer 602 is configured to issue computation commands to one or more devices that store data chunks and/or parity chunks that can be used to reconstruct the particular user data based on load. For example, in response to a data operation targeting the user data corresponding to the first user data chunk 1002 and the second user data chunk 1004, the application layer 602 may issue the first command 1008 to the first storage device 606A and the second command 1010 to the second storage device 606B; the first command 1008 to the first storage device 606A and the third command 1012 to the third storage device 606C; or the second command 1010 to the second storage device 606B and the third command 1012 to the third storage device 606C based on the relative loads of the storage devices 606A, 606B, 606C.

Figure 11:
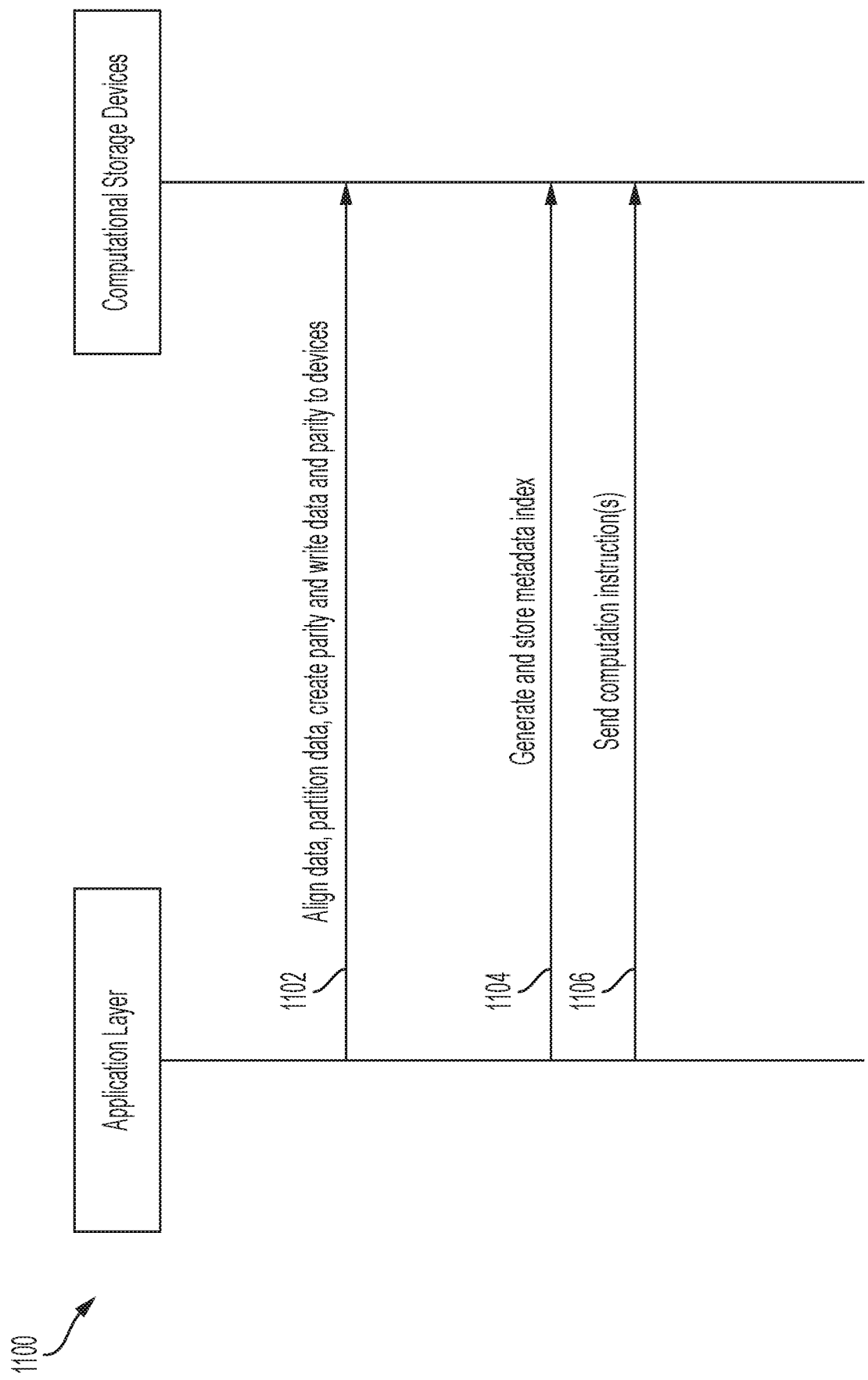
FIG. 11 is a diagram illustrating a method for performing in-storage computation conscious erasure coding.

Referring to FIG. 11, a diagram illustrating a method 1100 for performing in-storage computation conscious erasure coding is shown. The method 1100 may be performed by the system 600 of FIG. 6. The method 1100 includes, at an application layer, aligning data, partitioning the aligned data, performing EC to create parity data, and writing the data and parity data to one or more computational storage devices, at 1102. For example, the application layer 602 may align the first user data 608 (e.g., by padding segments of the first user data 608 to a chunk size). The application layer 602 may further partition the first user data 608 into the first data chunk 628, the second data chunk 630, and the third data chunk 632 and generate parity chunks 636, 638 based on the data chunks 628, 630, 632. The application layer 602 may further store the data chunks 628, 630, 632 and the parity chunks 636, 638 in the storage system 606.

The method 1100 further includes generating and storing a metadata index, at 1104. For example, the application layer 602 may generate the metadata index 802 pointing to a device and an address (e.g., a virtual address translatable by the device) at which the first data chunk 628 is stored in the device. The application layer 602 may further store the metadata index 802 in the storage system 606.

The method 1100 further includes sending one or more computation instructions from the application layer to the one or more computational storage devices, at 1106. For example, the application layer 602 may generate one or more of the first computation instruction 1008, the second computation instruction 1010, and the third computation instruction 1012 in response to a data operation targeting the user data corresponding to the first data chunk 1002 and the second data chunk 1004. The application layer 602 may address the one or more computation instructions based on the metadata index 802.

Thus, the method 1100 may be used to perform error coding of data and to issue in-storage computation commands. Because the method 1100 includes performing EC at the application layer, the application layer may align data in the data chunks generated by the EC operation in a way that results in efficient in-storage computations. For example, the application layer may align the data in the data chunks so that data segments (e.g., words, pages, etc.) do not break across chunks.

Figure 12:
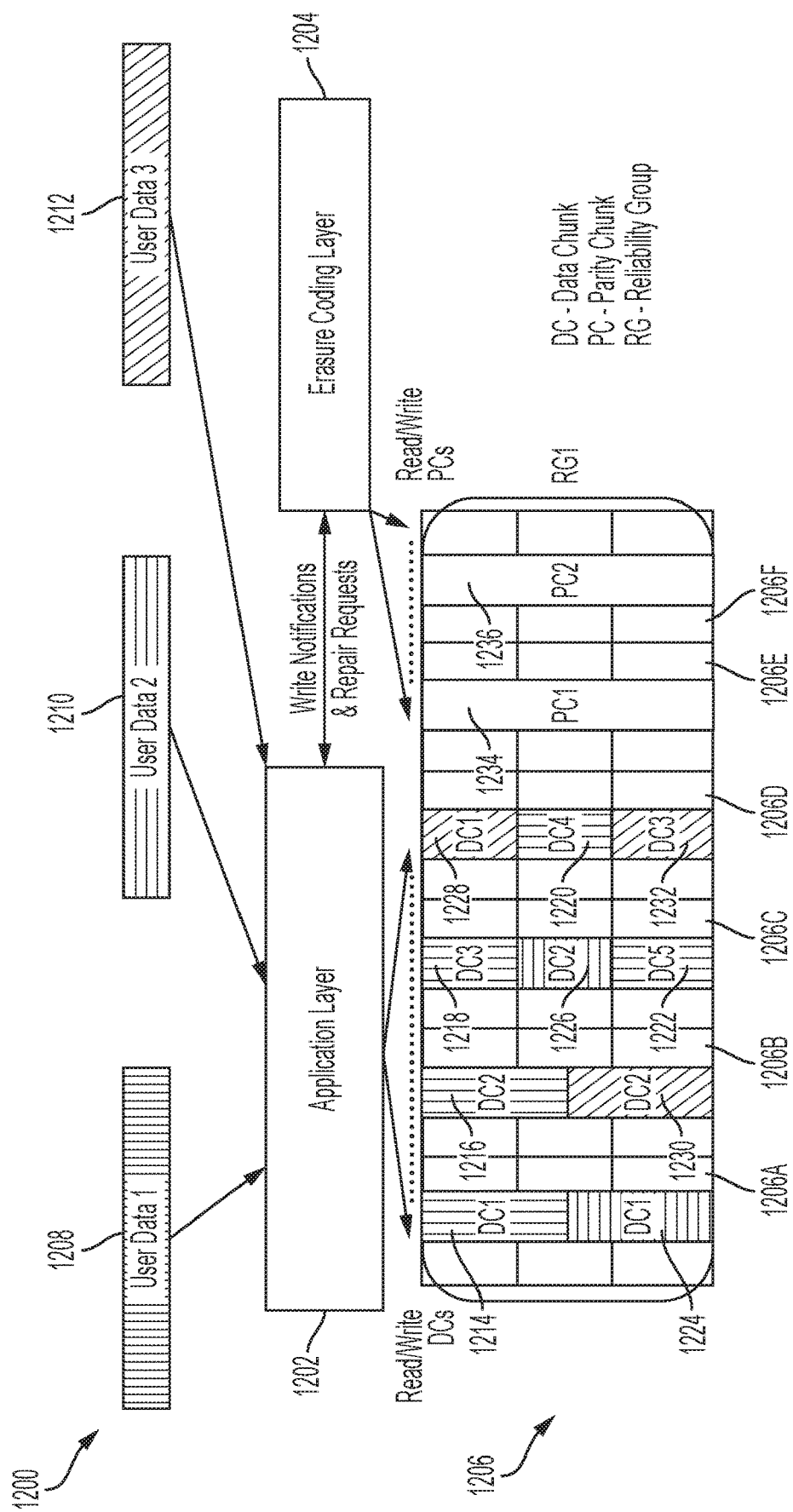
FIG. 12 is a diagram illustrating a system for performing in-storage computation conscious erasure coding in which an application layer partitions data into data chunks and an erasure coding layer generates parity chunks based on the data chunks.

Referring to FIG. 12, a diagram of a system 1200 for performing in-storage computation conscious erasure coding is shown. In the system 1200, data is partitioned into chunks by an application layer, and the application layer writes the chunks to storage devices. The application layer sends a notification to an EC layer identifying the data chunks, and the EC layer generates parity chunks based on the notifications.

The system 1200 includes an application layer 1202. The application layer 1202 may correspond to one or more applications and/or one or more file systems executed by one or more computing devices. The system 1200 further includes an EC layer 1204. The EC layer 1204 corresponds to software executing one or more computing devices to perform the functions described herein. The system 1200 further includes a storage system 1206 that includes a plurality of storage devices configured to execute in-storage computations. The storage system 1206 includes a first storage device 1206A, a second storage device 1206B, a third storage device 1206C, a fourth storage device 1206D, a fifth storage device 1206E, and a sixth storage device 1206F.

The application layer 1202 is configured to receive user data (e.g., via user input, from another application, from another computing device, or a combination thereof) and to partition the user data into data chunks for storage. In some implementations, the application layer 1202 is configured to align the user data prior to partitioning. In some implementations, the data chunks generated by the application layer 1202 are not uniform in size. For example, the application layer 1202 may be configured to partition user data based on boundaries between data units (e.g., pages) within the user data that have different lengths. The application layer 1202 is further configured to store the data chunks in the storage system 1206. In addition, the application layer 1202 is configured to send write notifications to the EC layer 1204 indicating data chunks that are to be written or have been written to the storage system 1206. Further, the application layer 1202 is configured to send computation commands to the storage system (e.g., in response to data operation requests). In addition, the application layer 1202 is configured to send repair requests to the EC layer 1204 in response to detecting erasure (or partial erasure) of a data chunk stored in the storage system 1206.

The EC layer 1204 is configured to receive the write notifications from the application layer 1202 and to generate parity chunks based on the data chunks indicated by the write notifications. The EC layer 1204 is configured to store the parity chunks in the storage system 1206. Further, the EC layer 1204 is configured to regenerate data chunks identified by the repair requests from the application layer 1202 based on the parity chunks.

In the illustrated example, the application layer 1202 receives first user data 1208, second user data 1210, and third user data 1212. The application layer 1202 partitions the first user data 1208 into a first data chunk 1214, a second data chunk 1216, a third data chunk 1218, a fourth data chunk 1220, and a fifth data chunk 1222. As shown, the data chunks 1214, 1216, 1218, 1220, 1222 are not uniform in size. The application layer 1202 may be configured to partition user data based on boundaries between data units within the user data. For example, the first user data 1208 may include a first page of size 7 KB, a second page of size 8 KB, a third page of size 5 KB, a fourth page of size 5 KB, and a fifth page of size 5 KB. Rather than padding the pages out to a maximum page size (e.g., 8 KB), the application layer 1202 may partition the first user data 1208 such that each page falls within a chunk having a size of the page. For example, the first page may correspond to the first data chunk 1214, the second page may correspond to the second data chunk 1216, the third page may correspond to the third data chunk 1218, and the fourth page may correspond to the fourth data chunk 1220. The application layer 1202 may write the data chunks 1214, 1216, 1218, 1220, 1222 to devices within the storage system 1206 using a variety of allocation techniques (e.g., round robin, etc.).

The application layer 1202 partitions the second user data 1210 into a first data chunk 1224 and a second data chunk 1226. The application layer 1202 further partitions the third user data 1212 into a first data chunk 1228, a second data chunk 1230, and a third data chunk 1232. The application layer 1202 stores the data chunks 1214, 1216, 1218, 1220, 1222, 1224, 1226, 1228, 1230, 1232 in the storage system 1206. The application layer 1202 further sends one or more write notifications identifying the data chunks 1214, 1216, 1218, 1220, 1224, 1226, 1228, 1230, 1232 to the EC layer 1204. In response to the one or more write notifications, the EC layer 1204 generates a first parity chunk 1234 and a second parity chunk 1236 based on the data chunks 1214, 1216, 1218, 1220, 1224, 1226, 1228, 1230, 1232 and stores the parity chunks 1234, 1236 in the storage system 1206. In some implementations, the application layer 1202 is further configured to generate a metadata index as described above with reference to FIGS. 8 and 9 and to store the metadata index in the storage system 1206.

In the event that the application layer 1202 detects erasure of one of the data chunks 1214, 1216, 1218, 1220, 1224, 1226, 1228, 1230, 1232, the application layer 1202 may issue a repair request identifying the data chunk to the EC layer 1204. In response to the repair request, the EC layer 1204 may regenerate the erased data chunk based on one or more of the parity chunks 1234, 1236 and the remaining data chunks of the data chunks, and return the restored data chunk to the application layer 1202 for storage in the storage system 1206.

The application layer 1202 is further configured to issue in-storage computation commands directly to the storage system 1206 (e.g., to one or more specific storage devices in the storage system 1206). As in the system 600, because the application layer 1202 partitions (and potentially aligns) user data, the user data may be stored in the storage system 1206 in a way that increases efficiency of in-storage computations. For example, the application layer 1202 may prevent data segments (e.g., words, pages, etc.) of the user data from breaking across data chunks stored in the storage system 1206.

Figure 13:
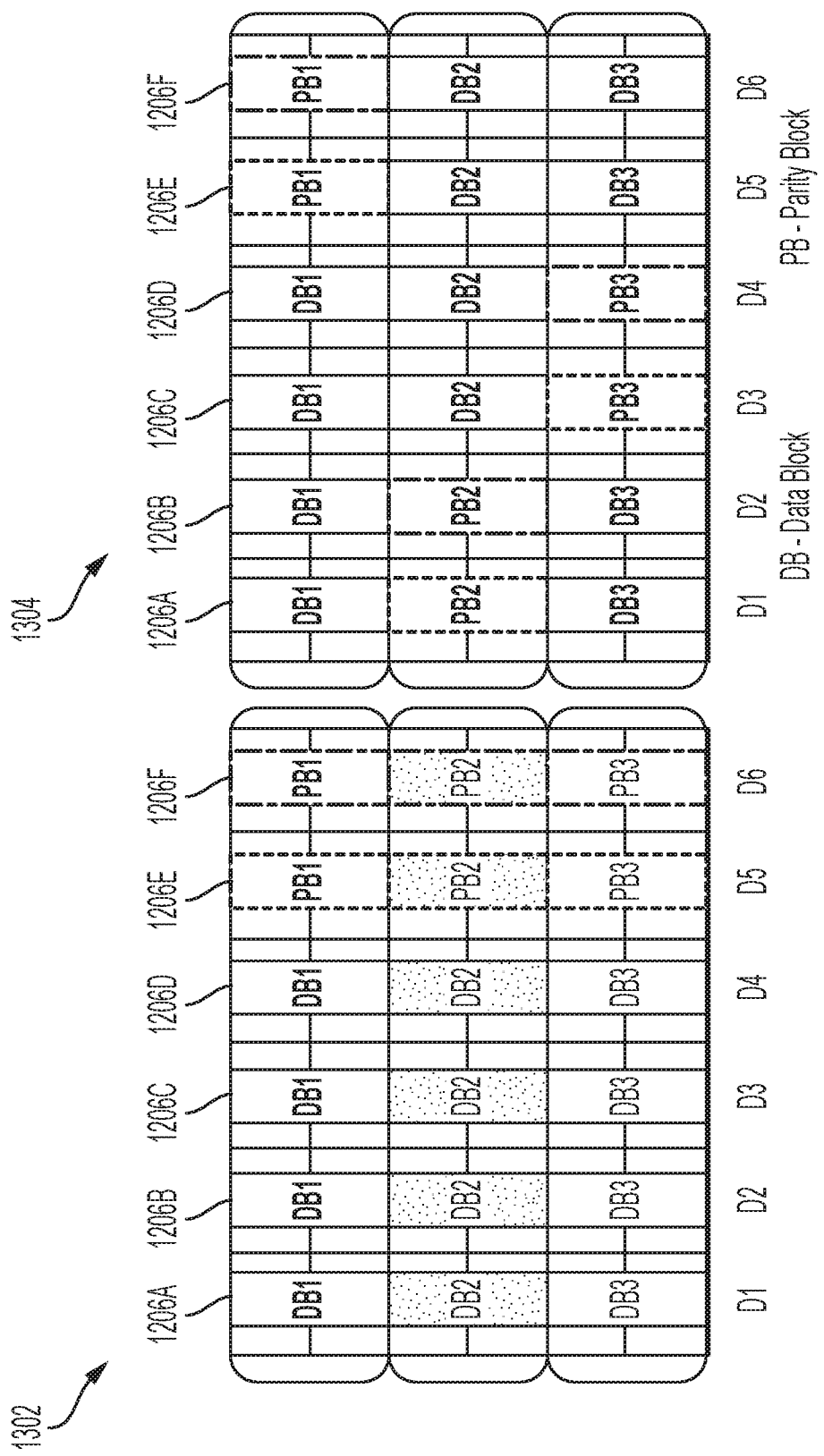
FIG. 13 is a diagram illustrating several storage schemes that may be used by systems for performing in-storage computation conscious erasure coding.

FIG. 13 depicts several storage schemes that may be implemented by a system for performing in-storage computation conscious erasure coding. While described and illustrated as performed by the application layer 1202 and the EC layer 1204, the illustrated storage schemes may also be implemented by the EC layer 104 or the application layer 602. In a first storage scheme, the application layer 1202 stores data chunks on storage devices dedicated to storing data chunks, and the EC layer 1204 stores parity chunks on storage devices dedicated to storing parity chunks. FIG. 13 includes a first diagram 1302 illustrating the first storage scheme. In the illustrated example, the application layer 1202 stores data chunks on the first storage device 1206A, the second storage device 1206B, the third storage device 1206C, and the fourth storage device 1206C. The EC layer 1204 stores parity chunks in the fifth storage device 1206E and the sixth storage device 1206F. One advantage of the first storage scheme is that the application layer 1202 can write data chunks to any block in a storage device dedicated to storing data chunks. Accordingly, the application layer 1202 need not ensure that data chunks are confined to data block boundaries dedicated to storing data chunks.

In a second storage scheme, the application layer 1202 and the EC layer 1204 distribute data chunks and parity chunks among the storage system 1206 (e.g., in a round robin fashion). An example of the second storage scheme is illustrated in a second diagram 1304 shown in FIG.

In some implementations, the data chunks generated by the application layer 1202 are logical block addressing (LBA) aligned, while in other implementations the data chunks are not LBA aligned. Further, the storage devices of the storage system 1206 may be block devices or key-value devices. In implementations in which the data chunks are not LBA aligned and the storage devices are block devices, the application layer 1202 may be configured to store data chunks in a number of LBAs equal to a ceiling of data chunk size divided by LBA size. Alternatively, the application layer 1202 may be configured to pack data from different data chunks into an LBA size and generate byte granular indexing information.

Figure 14:
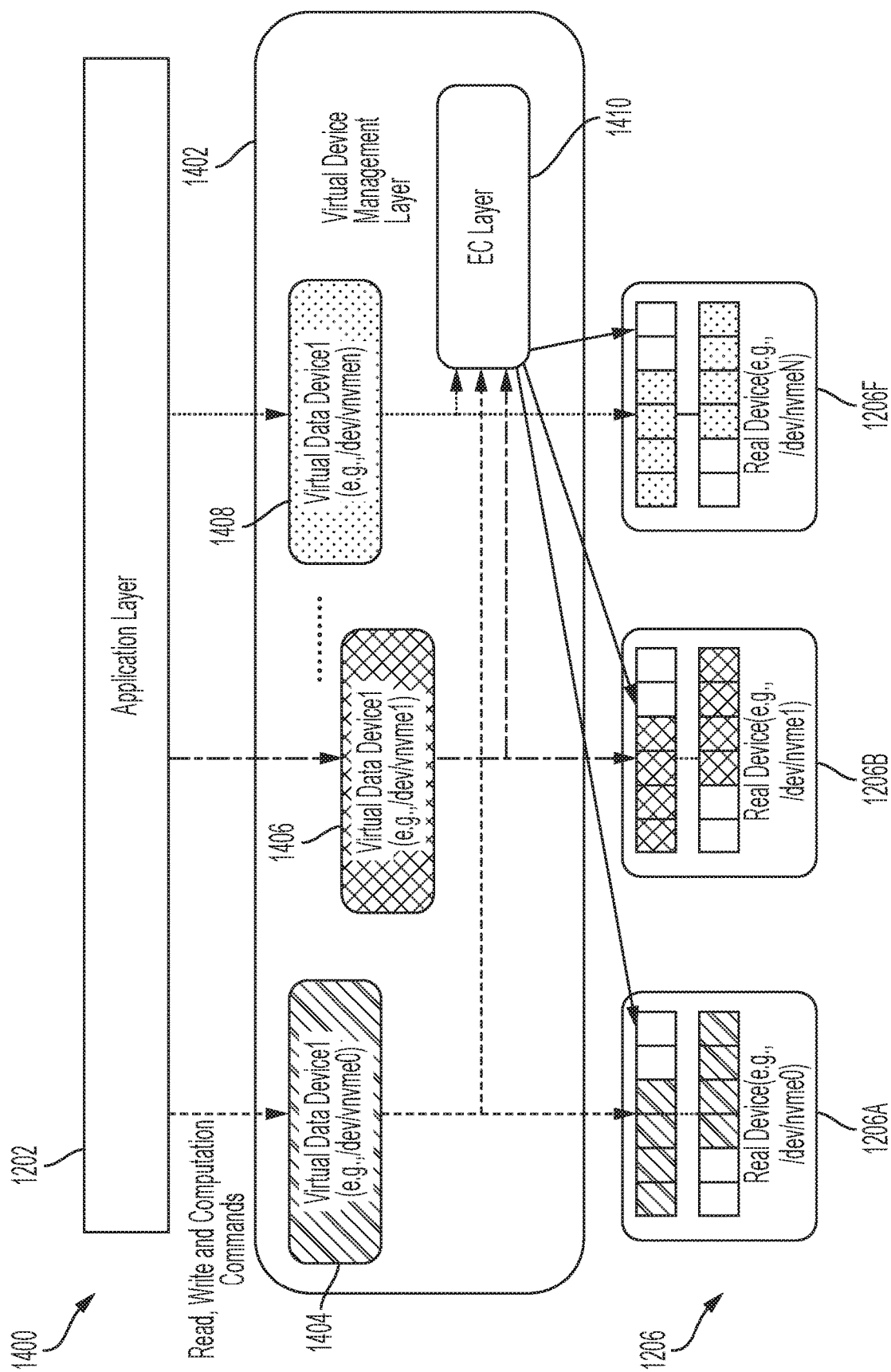
FIG. 14 is a diagram of a modified version of the system of FIG. 12 in which a virtual device management layer including an EC layer is located between an application layer and a storage system.

Various modifications may be made to the system 1200. For example, a virtual device management layer may be added between the application layer 1202 and the storage system 1206. FIG. 14 illustrates an example of a modified version of the system of FIG. 12 (system 1400) in which a virtual device management layer 1402 is located between the application layer 1202 and the storage system 1206. The virtual device management layer 1402 is provided by software executing on one or more computing devices. The virtual device management layer 1402 is configured to configure the storage system 1206 by allocating a first set of blocks of the storage system as data blocks and a second set of the blocks of the storage system as parity blocks. The virtual device management layer 1402 may configure the storage system 1206 according to one of the storage schemes described above with reference to FIG. 13. The virtual device management layer 1402 is further configured to provide access to expose one or more virtual storage devices to the application layer. The one or more virtual storage devices are mapped by the virtual device management layer 1402 to the data blocks of the storage system 1206. In the illustrated example, the virtual device management layer exposes a first virtual device 1404, a second virtual device 1406, and a third virtual device 1408 to the application layer 1202. The virtual device management layer 1402 is configured to map commands (e.g., read commands, write commands, computation commands, etc.) directed to the first virtual device 1404 to one or more data blocks in the storage system 1206. Similarly, the virtual device management layer 1402 is configured to map commands directed to the second virtual device 1406 and the third virtual device 1408 to corresponding data blocks in the storage system 1206.

The virtual device management layer 1402 further includes an EC layer 1410 that functions similarly to the EC layer 1204. As in the system 1200, the application layer 1202 is configured to partition data into data chunks and write the data chunks to the storage system 1206. However, in the system 1400, the application layer 1202 writes the data chunks to the storage system 1206 by sending a write command directed to one of the virtual devices 1404, 1406, 1408 to the virtual device management layer 1402. The virtual device management layer 1402 translates to one or more address ranges in the storage system 1206 and notifies the EC layer 1410. The EC layer 1410 generates one or more parity chunks based on the data chunks and writes the parity chunks to one or more blocks in the storage system 1206 that are allocated as parity blocks.

Figure 15:
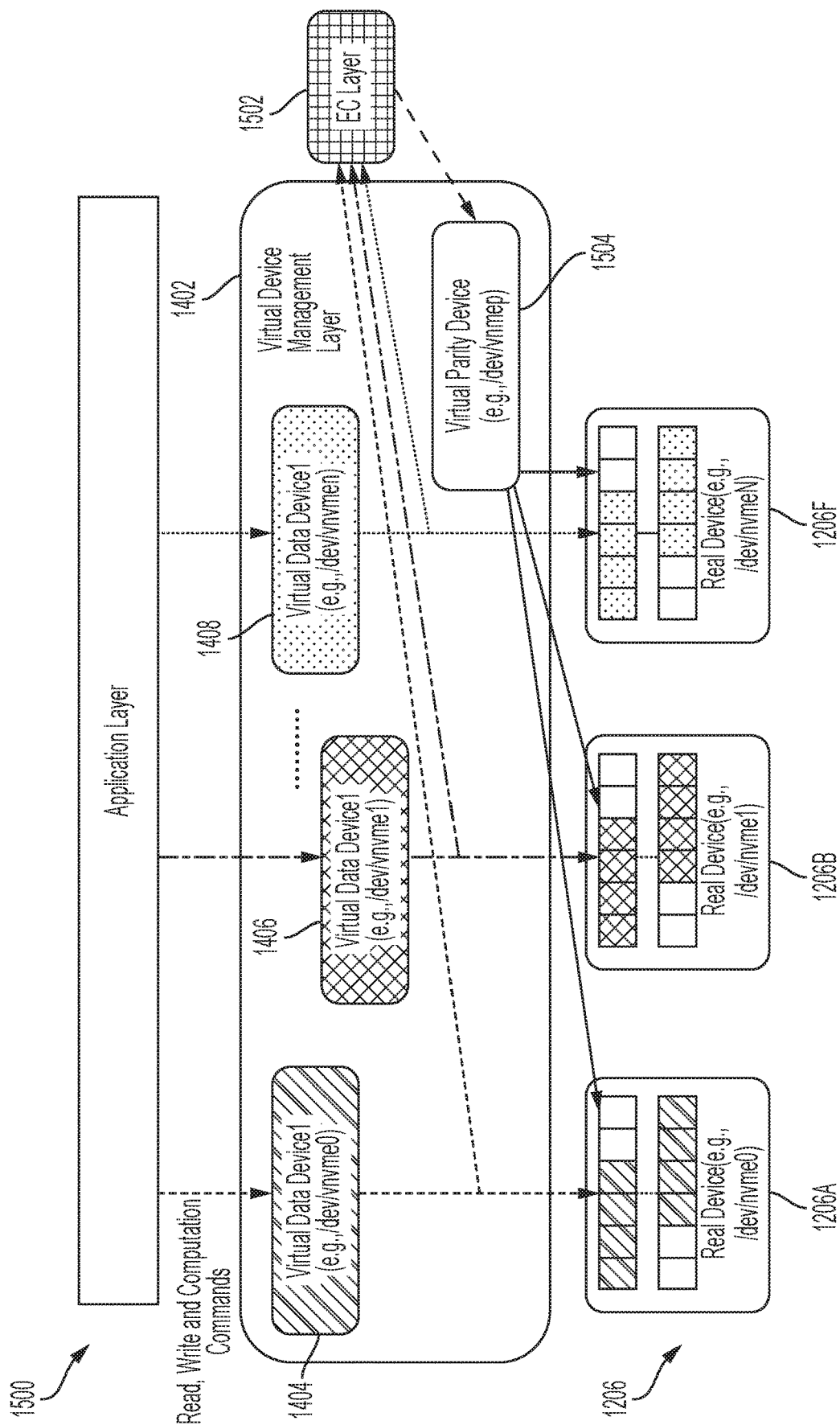
FIG. 15 is a diagram of a modified version of the system of FIG. 14 in which an EC layer is located outside of the virtual device management layer.

FIG. 15 illustrates a system 1500, which is a modified version of the system 1400. In the system 1500, an EC layer 1502 is located outside of the virtual device management layer 1402. The virtual device management layer 1402 exposes a virtual parity device 1504 to the EC layer 1502 and maps virtual addresses of the virtual parity device 1504 to parity blocks of the storage system 1206. The virtual device management layer 1402 is configured to send a notification to the EC layer 1502 in response to a write command from the application layer 1502. The notification identifies data chunks written by the write command. The EC layer 1502 is configured to generate parity chunks based on the data chunks. The EC layer 1502 is further configured to send a command to the virtual device management layer 1402 to write the parity chunks to the virtual parity device 1504. The virtual device management layer 1402 is configured to map the command from the EC layer 1502 to one or more parity blocks in the storage system 1206 and write the parity chunks to the one or more parity blocks.

Figure 16:
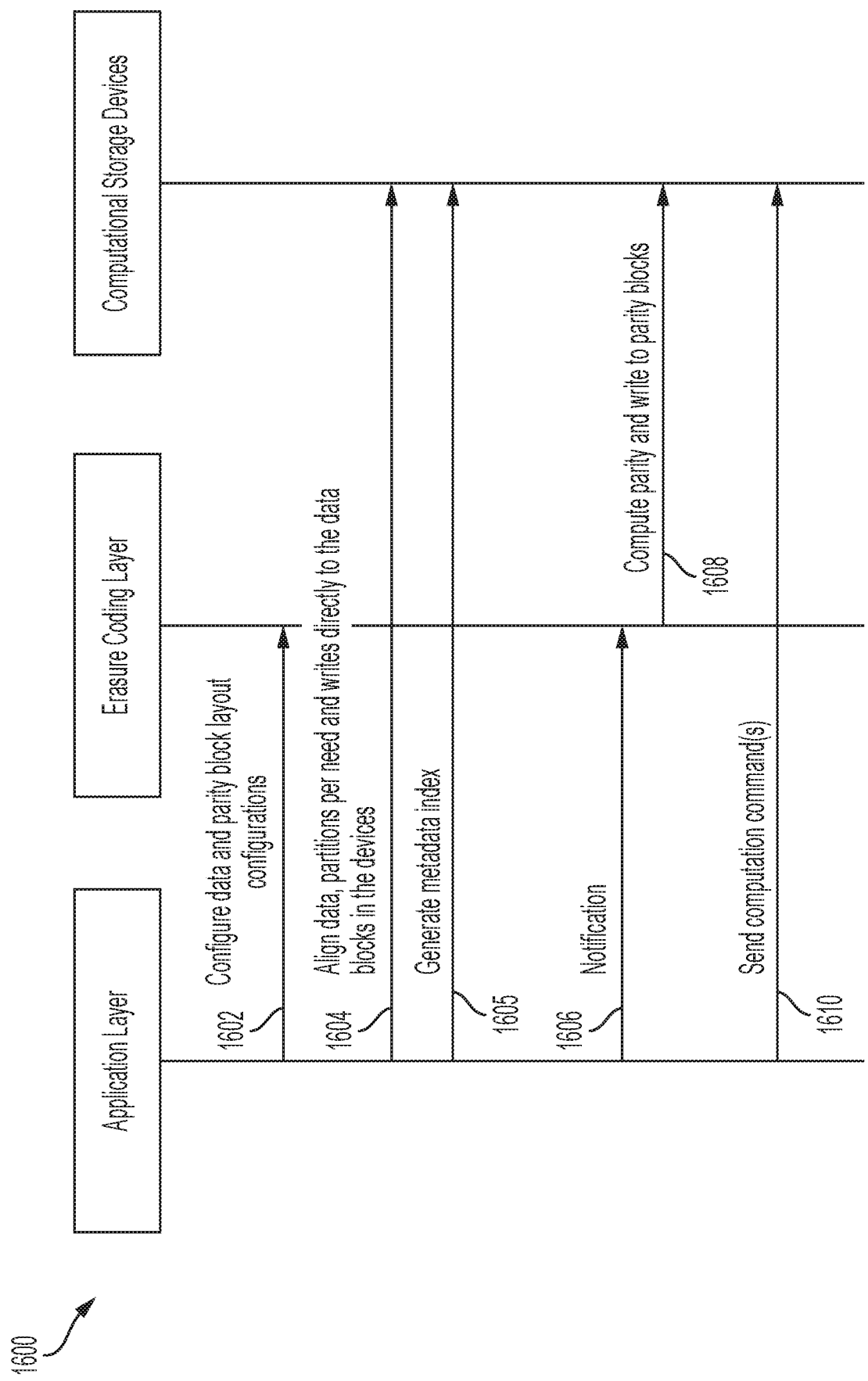
FIG. 16 is a diagram illustrating a method for performing in-storage computation conscious erasure coding.

Referring to FIG. 16, a diagram illustrating a method 1600 for performing in-storage computation conscious erasure coding is shown. The method 1600 may be performed by the system 1200 of FIG. 12. The method 1600 includes configuring, by an application layer, data and parity block layout configurations at storage devices, at 1602. For example, the application layer 1202 may configure the storage system 1206 (e.g., in a RAID configuration) and designate particular blocks of the storage system 1206 as parity blocks and particular blocks as data blocks (e.g., as shown in FIG. 13).

The method 1600 further includes aligning data, partitioning the data, and writing the data to blocks in the storage devices, at 1604. For example, the application layer 1202 may receive the first user data 1208, align the first user data 1208, and partition the first user data 1208 into a first data chunk 1214, a second data chunk 1216, a third data chunk 1218, a fourth data chunk 1220, and a fifth data chunk 1222. The application layer 1202 may further store the data chunks 1214, 1216, 1218, 1220, 1222 directly on the storage system 1206.

The method 1600 further includes generating a metadata index, at 1605. For example, the application layer 1202 may generate a metadata index (similar to the metadata index 802) that points to a device and address of the first data chunk 1214. The application layer 1202 may store the metadata index in the plurality of storage system 1206.

The method 1600 further includes sending a notification from the application layer to an EC layer, at 1606. For example, the application layer 1202 may send a notification identifying the data chunks 1214, 1216, 1218, 1220, 1222 to the EEC layer 1204.

The method 1600 further includes computing parity and writing to parity blocks, at 1608. For example, the EC layer 1204 may generate the first parity chunk 1234 and/or the second parity chunk 1236 based on the data chunks 1214, 1216, 1218, 1220, 1222 and store the first parity chunk 1234 and/or the second parity chunk 1236 in the storage system 1206.

The method 1600 further includes sending one or more computation commands from the application layer to the storage devices, at 1610. For example, the application layer 1202 may issue one or more computation commands to one or more storage devices in the storage system 1206. The application layer 1202 may address the one or more computation commands based on the metadata index.

Thus, the method 1600 may be used to perform error coding of data and to issue in-storage computation commands. Because the method 1600 includes partitioning data chunks at the application layer, the application layer may align data in the data chunks in a way that results in efficient in-storage computations. For example, the application layer may align the data in the data chunks so that data segments (e.g., words, pages, etc.) do not break across chunks.

Figure 17:
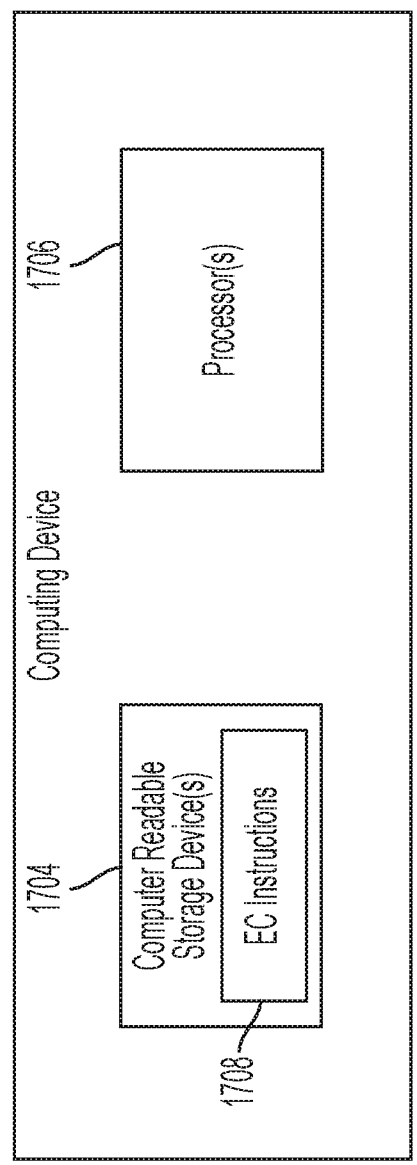
FIG. 17 is a diagram illustrating a computing device that may be used to perform in-storage computation conscious erasure coding.

FIG. 17 is a diagram illustrating a computing device 1700. One or more components described in the foregoing examples may include a computing device, such as the computing device 1700. For example, one or more of the application layers 102, 602, 1202, the EC layers 104, 1204, or a combination thereof may correspond to software executing on one or more computing devices, such as the computing device 1700.

The computing device 1700 includes one or more computer readable storage devices 1704 storing EC instructions 1708. The one or more computer readable storage devices 1704 may include a solid state drive, a hard drive, an optical disc, a random access memory, other types of computer storage, or a combination thereof. As used herein, a "computer readable storage device" is an article of manufacture and is not a transitory signal.

The computing device 1700 further includes one or more processors 1706. The one or more processors 1706 may include central processor units and/or other processors. The EC instructions 1708 are executable by the one or more processors 1706 to perform one or more of the operations described herein. Thus, the computing device 1700 may correspond to components (or portions thereof) described herein.

The foregoing is illustrative of example embodiments, and is not to be construed as being limiting thereof. Although a few example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as being limited to the specific embodiments disclosed, and that modifications to the disclosed example embodiments, as well as other example embodiments, are intended to be included within the scope of the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

When a certain embodiment may be implemented differently, a specific process order may be performed differently from the described order. For example, two consecutively described processes or method operations may be performed substantially at the same time or performed in an order different from the described order.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors in one or more computing devices, executing computer program instructions and interacting with other system components for performing the various functionalities described herein. The computer program instructions are stored in a memory, which may be implemented in a computing device using a standard memory device, such as, for example, a random access memory (RAM). The computer program instructions may also be stored in other non-transitory computer readable media, such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices, without departing from the spirit and scope of the example embodiments of the present disclosure.

Unless otherwise defined, all terms (including technical and scientific terms) used herein have the same meanings as are commonly understood by those of ordinary skill in the art to which the present disclosure belongs. It will be further understood that terms, such as those defined in commonly used dictionaries, should be interpreted as having meanings that are consistent with their meanings in the context of the

What is claimed is:

1. A method comprising:
sending, from an application layer, a chunk size setting for a storage system to an erasure coding layer;
receiving, at the application layer, user data;
determining, at the application layer, data units of the user data to be stored together in a same chunk of the storage system;
aligning, at the application layer, the user data based on the data units determined to be stored together, and by padding the data units determined to be stored together such that the padded data units correspond to a size indicated by the chunk size setting;
sending the aligned user data to the erasure coding layer;
partitioning, at the erasure coding layer, the aligned user data by splitting the user data into at least a first data chunk and a second data chunk based on the chunk size setting such that the data units that are determined to be stored together including the padding are stored together as the first data chunk;
generating, at the erasure coding layer, a parity chunk based on the first data chunk and the second data chunk;
sending, from the erasure coding layer, the first data chunk, the second data chunk, and the parity chunk to the storage system; and
sending, from the application layer, a computation command to a first storage device, a second storage device, or a third storage device of the storage system, the computation command instructing the first storage device, the second storage device, or the third storage device to perform an in-storage computation to generate the user data based on at least one of the first data chunk, the second data chunk, and the parity chunk.

2. The method of claim 1, wherein the chunk size setting is associated with a first application, the method further comprising:
sending, from the application layer, a second chunk size setting different from the chunk size setting to the erasure coding layer, the second chunk size setting associated with a second application;
receiving, at the application layer, second user data associated with the second application;
aligning, at the application layer, the second user data based on the second chunk size setting;
sending the aligned second user data to the erasure coding layer;
partitioning, at the erasure coding layer, the aligned second user data into a third data chunk and a fourth data chunk;
generating, at the erasure coding layer, a second parity chunk based on the third data chunk and the fourth data chunk; and
sending, from the erasure coding layer, the third data chunk, the fourth data chunk, and the second parity chunk to the storage system.

3. The method of claim 1, wherein sending, from the erasure coding layer, the first data chunk, the second data chunk, and the parity chunk to the storage system includes sending the first data chunk and the parity chunk to the first storage device of the storage system.

4. The method of claim 1, wherein sending, from the erasure coding layer, the first data chunk, the second data chunk, and the parity chunk to the storage system includes sending the parity chunk to the third storage device dedicated to storing parity chunks.

5. The method of claim 1, wherein the padding the data units comprises padding a page of data to the size indicated by the chunk size setting.

6. The method of claim 1, wherein the data units are operated on by the application layer.

7. The method of claim 6, wherein the data units determined to be stored together correspond to related data.

8. The method of claim 1, further comprising:
partitioning, at the application layer, a metadata index to metadata index chunks, and applying erasure coding to the metadata index chunks to generate parity chunks; and
sending the metadata index to the storage system.

9. A method comprising:
receiving, at an application layer, user data;
determining, at the application layer, data units of the user data to be stored together in a same chunk of a storage system;
padding the data units determined to be stored together such that the padded data units correspond to a size indicated by a chunk size setting;
partitioning, at the application layer, the user data by splitting the user data into at least a first data chunk and a second data chunk for a storage system based on the chunk size setting such that the data units that are determined to be stored together including the padding are stored together as the first data chunk;
generating, at the application layer, a parity chunk based on the first data chunk and the second data chunk;
sending, from the application layer, the first data chunk, the second data chunk, and the parity chunk to the storage system; and
further comprising sending, from the application layer, a computation command to a first storage device, a second storage device, or a third storage device, the computation command instructing the first storage device, the second storage device, or the third storage device to perform an in-storage computation based to generate user data based on at least one of the first data chunk, the second data chunk, and the parity chunk.

10. The method of claim 9, further comprising storing, by the application layer, a metadata index indicating the first storage device of the storage system at which the first data chunk is stored and an address of the first storage device at which the first data chunk is stored.

11. The method of claim 10, further comprising addressing, at the application layer, the computation command based on the metadata index.

12. The method of claim 9, wherein sending, from the application layer, the first data chunk, the second data chunk, and the parity chunk to the storage system includes sending the first data chunk and the parity chunk to the first storage device of the storage system.

13. The method of claim 9, wherein sending, from the application layer, the first data chunk, the second data chunk, and the parity chunk to the storage system includes sending the parity chunk to the third storage device dedicated to storing parity chunks.

14. A method comprising:
receiving, at an application layer, user data;
determining, at the application layer, data units of the user data to be stored together in a same chunk of a storage system;

padding the data units determined to be stored together such that the padded data units correspond to a size indicated by a chunk size setting;

partitioning, at the application layer, the user data by splitting the user data into at least a first data chunk and a second data chunk for a storage system based on the chunk size setting such that the data units that are determined to be stored together including the padding are stored together as the first data chunk;

sending, from the application layer, a notification to an erasure coding layer, the notification identifying the first data chunk and the second data chunk;

generating, at the erasure coding layer, a parity chunk based on the first data chunk and the second data chunk;

sending, from the application layer, the first data chunk and the second data chunk to the storage system;

sending, from the erasure coding layer, the parity chunk to the storage system; and sending, from the application layer, a computation command to a first storage device, a second storage device, or a third storage device, the computation command instructing the first storage device, the second storage device, or the third storage device to perform an in-storage computation to generate user data based on at least one of the first data chunk, the second data chunk, and the parity chunk.

15. The method of claim 14, further comprising storing, by the application layer, a metadata index indicating the first storage device of the storage system at which the first data chunk is stored and an address of the first storage device at which the first data chunk is stored.

16. The method of claim 15, further comprising addressing, at the application layer, the computation command based on the metadata index.

17. The method of claim 14, wherein the parity chunk and the first data chunk are sent to the first storage device of the storage system.

18. The method of claim 14, wherein the parity chunk is sent to the third storage device dedicated to storing parity chunks.

* * * * *